United States Patent
Cournane et al.

(10) Patent No.: US 12,458,498 B2
(45) Date of Patent: Nov. 4, 2025

(54) IMPLANTING GRAFTS TO VALVE LEAFLETS FOR CARDIAC PROCEDURES

(71) Applicant: Edwards Lifesciences Corporation, Irvine, CA (US)

(72) Inventors: Stephen Cournane, Severn, MD (US); Felino V. Cortez, Jr., Bowie, MD (US); Stephen Epstein, Baltimore, MD (US); Luke Anthony Zanetti, Parkton, MD (US); Julie Marie Etheridge, Ellicott City, MD (US)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 779 days.

(21) Appl. No.: 17/650,225

(22) Filed: Feb. 7, 2022

(65) Prior Publication Data
US 2022/0249232 A1 Aug. 11, 2022

Related U.S. Application Data

(60) Provisional application No. 63/147,918, filed on Feb. 10, 2021.

(51) Int. Cl.
*A61F 2/24* (2006.01)
(52) U.S. Cl.
CPC .......... *A61F 2/2463* (2013.01); *A61F 2/2457* (2013.01); *A61F 2220/0008* (2013.01);
(Continued)
(58) Field of Classification Search
CPC .................. A61F 2/2463; A61F 2/2457; A61F 2220/0008; A61F 2220/0075
See application file for complete search history.

(56) References Cited

U.S. PATENT DOCUMENTS

| | | |
|---|---|---|
| 3,131,957 A | 5/1964 | Musto |
| 3,752,516 A | 8/1973 | Mumma |

(Continued)

FOREIGN PATENT DOCUMENTS

| | | | | |
|---|---|---|---|---|
| CN | 202821715 U | * | 3/2013 | ....... A61B 17/00234 |
| CN | 104055600 A | * | 9/2014 | |

(Continued)

OTHER PUBLICATIONS

Translation of Foreign Document: CN-104055600-A (Year: 2014).*

(Continued)

*Primary Examiner* — Sarah W Aleman
*Assistant Examiner* — Paris Marie Blass
(74) *Attorney, Agent, or Firm* — Chang and Hale LLP

(57) ABSTRACT

Described herein are methods and apparatus for implanting grafts to leaflets for cardiac procedures that are performed minimally-invasively while the heart is beating. The graft elongates, reinforces, and patches the leaflet. In certain disclosed examples, the graft is secured to the atrium or ventricle side of the leaflet with an artificial cord implanted on an edge of the graft to improve coaptation. In some disclosed examples, the graft is secured to both leaflets to enable an edge-to-edge procedure similar to the Alfieri technique. Some examples of the disclosed methods including introducing the graft into the ventricle and guiding it into place using artificial cords previously implanted in the leaflet.

20 Claims, 30 Drawing Sheets

(52) U.S. Cl.
CPC .............. *A61F 2220/0075* (2013.01); *A61F 2250/0012* (2013.01)

(56) References Cited

U.S. PATENT DOCUMENTS

| | | | |
|---|---|---|---|
| 4,403,797 A | 9/1983 | Ragland, Jr. | |
| 4,662,376 A | 5/1987 | Belanger | |
| 4,807,625 A | 2/1989 | Singleton | |
| 5,144,961 A | 9/1992 | Chen et al. | |
| 5,147,316 A | 9/1992 | Castillenti | |
| 5,312,423 A | 5/1994 | Rosenbluth et al. | |
| 5,391,176 A | 2/1995 | de la Torre | |
| 5,405,352 A | 4/1995 | Weston | |
| 5,454,821 A | 10/1995 | Harm et al. | |
| 5,472,446 A | 12/1995 | de la Torre | |
| 5,507,754 A | 4/1996 | Green et al. | |
| 5,527,323 A | 6/1996 | Jervis et al. | |
| 5,554,184 A | 9/1996 | Machiraju | |
| 5,626,614 A | 5/1997 | Hart | |
| 5,643,293 A | 7/1997 | Kogasaka et al. | |
| 5,681,331 A | 10/1997 | de la Torre et al. | |
| 5,716,368 A | 2/1998 | de la Torre et al. | |
| 5,727,569 A | 3/1998 | Benetti et al. | |
| 5,728,109 A | 3/1998 | Schulze et al. | |
| 5,746,752 A | 5/1998 | Burkhart | |
| 5,769,862 A | 6/1998 | Kammerer et al. | |
| 5,797,928 A | 8/1998 | Kogasaka | |
| 5,824,065 A | 10/1998 | Gross | |
| 5,931,868 A | 8/1999 | Gross | |
| 5,957,936 A | 9/1999 | Yoon et al. | |
| 5,971,447 A | 10/1999 | Steck, III | |
| 6,010,531 A | 1/2000 | Donlon et al. | |
| 6,074,417 A | 6/2000 | Peredo | |
| 6,269,819 B1 | 8/2001 | Oz et al. | |
| 6,332,893 B1 | 12/2001 | Mortier et al. | |
| 6,562,051 B1 | 5/2003 | Bolduc et al. | |
| 6,626,930 B1 | 9/2003 | Allen et al. | |
| 6,629,534 B1 | 10/2003 | Goar et al. | |
| 6,752,810 B1 | 6/2004 | Gao et al. | |
| 6,840,246 B2 | 1/2005 | Downing | |
| 6,921,408 B2 | 7/2005 | Sauer | |
| 6,940,246 B2 | 9/2005 | Mochizuki et al. | |
| 6,978,176 B2 | 12/2005 | Lattouf | |
| 6,991,635 B2 | 1/2006 | Takamoto et al. | |
| 6,997,950 B2 | 2/2006 | Chawla | |
| 7,112,207 B2 | 9/2006 | Allen et al. | |
| 7,291,168 B2 | 11/2007 | Macoviak et al. | |
| 7,294,148 B2 | 11/2007 | McCarthy | |
| 7,309,086 B2 | 12/2007 | Carrier | |
| 7,316,706 B2 | 1/2008 | Bloom et al. | |
| 7,373,207 B2 | 5/2008 | Lattouf | |
| 7,431,692 B2 | 10/2008 | Zollinger et al. | |
| 7,513,908 B2 | 4/2009 | Lattouf | |
| 7,534,260 B2 | 5/2009 | Lattouf | |
| 7,608,091 B2 | 10/2009 | Goldfarb et al. | |
| 7,618,449 B2 | 11/2009 | Tremulis et al. | |
| 7,632,308 B2 | 12/2009 | Loulmet | |
| 7,635,386 B1 | 12/2009 | Gammie | |
| 7,666,196 B1 | 2/2010 | Miles | |
| 7,744,609 B2 | 6/2010 | Allen et al. | |
| 7,837,727 B2 | 11/2010 | Goetz et al. | |
| 7,871,368 B2 | 1/2011 | Zollinger et al. | |
| 7,871,433 B2 | 1/2011 | Attouf | |
| 7,959,650 B2 | 6/2011 | Kaiser et al. | |
| 8,029,518 B2 | 10/2011 | Goldfarb et al. | |
| 8,029,565 B2 | 10/2011 | Lattouf | |
| 8,043,368 B2 | 10/2011 | Crabtree | |
| 8,147,542 B2 | 4/2012 | Maisano et al. | |
| 8,187,323 B2 | 5/2012 | Mortier et al. | |
| 8,226,711 B2 | 7/2012 | Mortier et al. | |
| 8,241,304 B2 | 8/2012 | Bachman | |
| 8,252,050 B2 | 8/2012 | Maisano et al. | |
| 8,292,884 B2 | 10/2012 | Levine et al. | |
| 8,303,622 B2 | 11/2012 | Alkhatib | |
| 8,333,788 B2 | 12/2012 | Maiorino | |
| 8,382,829 B1 | 2/2013 | Call et al. | |
| 8,439,969 B2 | 5/2013 | Gillinov et al. | |
| 8,454,656 B2 | 6/2013 | Tuval | |
| 8,465,500 B2 | 6/2013 | Speziali | |
| 8,475,525 B2 | 7/2013 | Maisano et al. | |
| 8,500,800 B2 | 8/2013 | Maisano et al. | |
| 8,608,758 B2 | 12/2013 | Singhatat et al. | |
| 8,663,278 B2 | 3/2014 | Mabuchi et al. | |
| 8,771,296 B2 | 7/2014 | Nobles et al. | |
| 8,828,053 B2 | 9/2014 | Sengun et al. | |
| 8,852,213 B2 | 10/2014 | Gammie et al. | |
| 8,888,791 B2 | 11/2014 | Jaramillo et al. | |
| 8,940,008 B2 | 1/2015 | Kunis | |
| 9,131,884 B2 | 9/2015 | Holmes et al. | |
| 9,192,287 B2 | 11/2015 | Saadat et al. | |
| 2002/0013571 A1 | 1/2002 | Goldfarb et al. | |
| 2003/0023254 A1 | 1/2003 | Chiu | |
| 2003/0094180 A1 | 5/2003 | Benetti | |
| 2003/0105519 A1 | 6/2003 | Fasol et al. | |
| 2003/0120264 A1 | 6/2003 | Lattouf | |
| 2003/0120341 A1 | 6/2003 | Shennib et al. | |
| 2004/0044365 A1 | 3/2004 | Bachman | |
| 2004/0093023 A1 | 5/2004 | Allen et al. | |
| 2004/0199183 A1 | 10/2004 | Oz et al. | |
| 2005/0004667 A1 | 1/2005 | Swinford et al. | |
| 2005/0019735 A1 | 1/2005 | Demas | |
| 2005/0075654 A1 | 4/2005 | Kelleher | |
| 2005/0119735 A1 | 6/2005 | Spence et al. | |
| 2005/0149067 A1 | 7/2005 | Takemoto et al. | |
| 2005/0149093 A1 | 7/2005 | Pokorney | |
| 2005/0154402 A1 | 7/2005 | Sauer et al. | |
| 2005/0216036 A1 | 9/2005 | Nakao | |
| 2005/0216077 A1 | 9/2005 | Mathis et al. | |
| 2005/0261710 A1 | 11/2005 | Sakamoto et al. | |
| 2005/0267493 A1 | 12/2005 | Schreck et al. | |
| 2006/0030866 A1 | 2/2006 | Schreck | |
| 2006/0100698 A1 | 5/2006 | Lattouf | |
| 2006/0111739 A1 | 5/2006 | Staufer et al. | |
| 2006/0167541 A1 | 7/2006 | Lattouf | |
| 2006/0190030 A1 | 8/2006 | To et al. | |
| 2006/0229708 A1* | 10/2006 | Powell | A61F 2/246 |
| | | | 623/1.24 |
| 2006/0282088 A1 | 12/2006 | Ryan | |
| 2007/0001857 A1 | 1/2007 | Hartmann et al. | |
| 2007/0049952 A1 | 3/2007 | Weiss | |
| 2007/0055292 A1 | 3/2007 | Ortiz et al. | |
| 2007/0112422 A1 | 5/2007 | Dehdashtian | |
| 2007/0112425 A1 | 5/2007 | Schaller et al. | |
| 2007/0118151 A1 | 5/2007 | Davidson | |
| 2007/0118154 A1 | 5/2007 | Crabtree | |
| 2007/0149995 A1 | 6/2007 | Quinn et al. | |
| 2007/0197858 A1 | 8/2007 | Goldfarb et al. | |
| 2007/0213582 A1 | 9/2007 | Zollinger et al. | |
| 2007/0270793 A1 | 11/2007 | Lattouf | |
| 2008/0004597 A1 | 1/2008 | Lattouf et al. | |
| 2008/0009888 A1 | 1/2008 | Ewers et al. | |
| 2008/0065203 A1 | 3/2008 | Khalapyan | |
| 2008/0140093 A1 | 6/2008 | Stone et al. | |
| 2008/0167714 A1 | 7/2008 | St. Goar et al. | |
| 2008/0188893 A1 | 8/2008 | Selvitelli et al. | |
| 2008/0195126 A1 | 8/2008 | Solem | |
| 2008/0228223 A1 | 9/2008 | Alkhatib | |
| 2008/0249504 A1 | 10/2008 | Lattouf et al. | |
| 2008/0269781 A1 | 10/2008 | Funamura et al. | |
| 2009/0005863 A1 | 1/2009 | Goetz et al. | |
| 2009/0043153 A1 | 2/2009 | Zollinger et al. | |
| 2009/0105729 A1 | 4/2009 | Zentgraf | |
| 2009/0105751 A1 | 4/2009 | Zentgraf | |
| 2009/0276038 A1 | 11/2009 | Tremulis et al. | |
| 2010/0023056 A1 | 1/2010 | Johansson et al. | |
| 2010/0023117 A1 | 1/2010 | Yoganathan et al. | |
| 2010/0023118 A1 | 1/2010 | Medlock et al. | |
| 2010/0042147 A1* | 2/2010 | Janovsky | A61F 2/2457 |
| | | | 606/228 |
| 2010/0174297 A1 | 7/2010 | Speziali | |
| 2010/0179574 A1 | 7/2010 | Longoria et al. | |
| 2010/0210899 A1 | 8/2010 | Schankereli | |
| 2010/0298930 A1 | 11/2010 | Orlov | |
| 2011/0015476 A1 | 1/2011 | Franco | |

(56) References Cited

U.S. PATENT DOCUMENTS

| | | | |
|---|---|---|---|
| 2011/0022083 A1 | 1/2011 | DiMatteo et al. | |
| 2011/0022084 A1 | 1/2011 | Sengun et al. | |
| 2011/0028995 A1 | 2/2011 | Miraki et al. | |
| 2011/0029071 A1* | 2/2011 | Zlotnick | A61B 17/00234 623/2.11 |
| 2011/0060407 A1 | 3/2011 | Ketai et al. | |
| 2011/0106106 A1 | 5/2011 | Meier et al. | |
| 2011/0144743 A1 | 6/2011 | Lattouf | |
| 2011/0264208 A1 | 10/2011 | Duffy et al. | |
| 2011/0270278 A1 | 11/2011 | Overes et al. | |
| 2011/0288637 A1 | 11/2011 | De Marchena | |
| 2011/0307055 A1 | 12/2011 | Goldfarb et al. | |
| 2012/0004669 A1 | 1/2012 | Overes et al. | |
| 2012/0143215 A1 | 6/2012 | Corrao et al. | |
| 2012/0150223 A1 | 6/2012 | Manos et al. | |
| 2012/0179184 A1 | 7/2012 | Orlov | |
| 2012/0184971 A1 | 7/2012 | Zentgraf et al. | |
| 2012/0203072 A1 | 8/2012 | Lattouf et al. | |
| 2012/0226294 A1 | 9/2012 | Tuval | |
| 2012/0226349 A1 | 9/2012 | Tuval et al. | |
| 2013/0018459 A1 | 1/2013 | Maisano et al. | |
| 2013/0035757 A1 | 2/2013 | Zentgraf et al. | |
| 2013/0253641 A1 | 9/2013 | Lattouf | |
| 2013/0282059 A1 | 10/2013 | Ketai et al. | |
| 2013/0345749 A1 | 12/2013 | Sullivan et al. | |
| 2014/0031926 A1* | 1/2014 | Kudlik | A61F 2/2454 623/2.37 |
| 2014/0039607 A1 | 2/2014 | Kovach | |
| 2014/0067052 A1 | 3/2014 | Chau et al. | |
| 2014/0067054 A1* | 3/2014 | Chau | A61F 2/2454 623/2.36 |
| 2014/0114404 A1 | 4/2014 | Gammie et al. | |
| 2014/0214152 A1 | 7/2014 | Bielefeld | |
| 2014/0243968 A1 | 8/2014 | Padala | |
| 2014/0364938 A1 | 12/2014 | Longoria et al. | |
| 2015/0032127 A1 | 1/2015 | Gammie et al. | |
| 2015/0045879 A1 | 2/2015 | Longoria et al. | |
| 2018/0325663 A1* | 11/2018 | Taylor | A61F 2/2412 |
| 2019/0175346 A1 | 6/2019 | Schaffner et al. | |
| 2019/0290431 A1* | 9/2019 | Genovese | A61F 2/2463 |
| 2020/0155315 A1 | 5/2020 | Zhang et al. | |
| 2021/0196463 A1* | 7/2021 | Subramanian | A61F 2/2463 |
| 2022/0218328 A1* | 7/2022 | Epstein | A61B 17/0466 |
| 2023/0310155 A1* | 10/2023 | Cournane | A61B 17/06066 623/2.11 |
| 2024/0315688 A1* | 9/2024 | Cortez, Jr. | A61B 17/0401 |

FOREIGN PATENT DOCUMENTS

| | | |
|---|---|---|
| EP | 0791330 A3 | 11/1997 |
| EP | 3505077 A1 | 7/2019 |
| JP | 2013517110 A | 5/2013 |
| WO | 2004037463 A1 | 5/2004 |
| WO | 2006127509 A2 | 11/2006 |
| WO | 2007100268 A2 | 9/2007 |
| WO | 2007119057 A1 | 10/2007 |
| WO | 2008013869 A2 | 1/2008 |
| WO | 2008124110 A3 | 12/2008 |
| WO | 2008143740 A3 | 2/2009 |
| WO | 2006078694 A3 | 4/2009 |
| WO | 2009081396 A2 | 7/2009 |
| WO | 2010070649 A1 | 6/2010 |
| WO | 2010105046 A1 | 9/2010 |
| WO | 2012137208 A1 | 10/2012 |
| WO | 2013003228 A1 | 1/2013 |
| WO | 2014093861 A1 | 6/2014 |
| WO | 2015020816 A1 | 2/2015 |
| WO | 2016192481 A1 | 12/2016 |

OTHER PUBLICATIONS

Translation of Foreign Document: CN-202821715-U (Year: 2013).*
Alfieri, 0. el al., "The double-orifice technique in mitral valve repair: a +A198:A225simple solution for complex problems," (2001) J. Thorne. Cardiovasc. Surg., 122(4):674-681.
Barbero-Marcial, M. et al., "Transxiphoid Approach Without Median Sternotomy for the Repair of Atrial Septa! Defects," (1998) Ann. Thorne. Surg., 65(3):771-774.
Braunberger, E. et al., "Very long-term results (more than 20 years) of valve repair with Carpentier's echniques in honheumatic mitral valve insufficiency," (2001) Circulation, I 04:1-8-1-11.
Carpentier, Alain, "Cardiac valve surgery—the 'French coffection'," The Journal of Thoracic and Cardiovascular Surgery, vol. 86, No. 3, Sep. 1983, 15 pages.
David, T. E. et al., "Mitral valve repair by replacement of chordae tendineae with polytetrafluoroethylene sutures," ( 1991) J. Thorne. Cardiovasc. Surg., 101 (3 ): 495-50 I.
David, T. E. et al., "Replacement of chordae tendineae with Gore-Tex sutures: a ten-year experience," ( 1996) J. Heart Valve Dis., 5( 4 ):352-355.
Doty, D. B. et al., "Full-Spectrum Cardiac Surgery Through a Minimal Incision: Mini-Sternotomy (Lower Half) Technique," ( 1998) Ann. Thorne. Surg., 65(2):573-577.
Duran, C. M. G. et al., "Techniques for ensuring the correct length of new mitral chords," (2003) .I. Heart Valve Dis., 12(2):156-161.
Eishi, K. et al., "Long-term results of artificial chordae implantation in patients with mitral valve prolapse," (1997) J. Heal1 Valve Dis., 6(6):594-598.
Frater, R. W. M. ct al., "Chordal replacement in mitral valve repair," ( 1990) Circulation, 82(suppl. IV):IV-125-IV-130.
Frater, R. W. M., "Anatomical rules for the plastic repair of a diseased mitral valve," ( 1964) Thorax. 19:458-464.
Huber, C.H. et al., "Direct Access Valve Replacement (DAVR)—are we entering a new era in cardiac surgery?" (2006) European Journal ofCardio-thoracic Surgery, 29:380-385.
Hvass, U. et al., "Papillary Muscle Sling: A New Functional Approach to Mitra! Repair in Patients With Ischernic Left Ventricular Dysfunction and Functional Mitral Regurgitation," (2003) Ann. Thorne. Surg., 75:809-811.
Kasegawa, H. ct al., "Simple method for detennining proper length of allificial chordae in mitral valve repair," ( 1994) Ann. Thorne. Surg., 57(1 ):237-239.
Kobayashi, J. et al., "Ten-year experience of chordal replacement with expanded polytetrafluoroethylene in mitral valve repair," (2000) Circulation, J 02(19 Suppl 3):1ii-30-Jii-34.
Kunzelman, K. et al., "Replacement of mitral valve posterior chordae tenclincae with expanded polytetrafluorocthylcnc suture: a finite element study," (1996) J. Card. Surg., 11(2):136-145.
Langer, F. et al., "RING plus STRING: Papillary muscle repositioning as an adjunctive repair technique for ischemic mitral regurgitation," (2007) J. Thorne. Cardiovasc. Surg., 133( I): 247-249.
Maisano, F. et al., "The double-orifice technique as a standardized approach to treat mitral regurgitation due to severe rnyxomatous disease: surgical technique," (2000) European Journal of Cardiothorncic Surgery, 17(3):201-205.
Merendino, K. A. et al., "The open con-ection of rheumatic mitral regurgitation and/or stenosis with special reference to regurgitation treated by posteromedial annuloplasty utilizing a pump-oxygenator," (1959) Annals of Surgery, 150(1 ):5-22.
Minatoya, K. et al., "Pathologic aspects of polytetrafluoroethylene sutures in human heart," ( 1996) Ann. Thorac. Surg., 61 (3 ):883-887.
Mohty, D. ct al., "Very long-term survival and durability ofmitral valve repair for mitral valve prolapse," (2001) Circulation, 104:1-1-1-7.
*Neochord, Inc. v. University of Maryland, Bal Tim Ore*, Case No. JPR2016-00208, Decision on Institution of Inter Faries Review, 37 CFR §42. 108, Paper 6, Entered May 24, 2016, 28 pages.
*Neochord, Inc. v. University of Maryland, Baltimore*, Case No. IPR2016-00208, Declaration of Dr. Lishan Aklog, dated Nov. 17, 2015, 91 pages.
*Neochord, Inc. v. University of Maryland, Baltimore*, Case No. IPR2016-00208, Petition for inter ParlesReview of U.S. Pat. No. 7,635,386, dated Nov. 18, 2015, 65 pages.
Nigro, J. J. et al., "Neochordal repair of the posterior mitral leaflet," (2004) J. Thorne. Cardiovasc. Surg., 127 (2):440-447.

(56) References Cited

OTHER PUBLICATIONS

Phillips, M. R. et al., "Repair of anterior leaflet mitral valve prolapse: chordal replacement versus chordal shrntening," (2000) Ann. Thorac. Surg., 69(1):25-29.

Russo, M. J. et al.—Transapical Approach for Mitral Valve Repair during Insertion of a Left Ventricular Assist Device, Hindawi Publishing Corporation, The Scientific World Journal, vol. 2013, Article ID 925310, [online], Retrieved from the internet: <URL: http://dx.doi.org/J 0.1155/2013/92531 O> Apr. 11, 2013, 4 pages.

Sarsam, M.A. I., "Simplified technique for determining the length of artificial cl1ordae in milral valve repair," (2002) Ann. Thorac. Surg., 73(5): 1659-1660.

Savage, E. B. et al., Use of mitral valve repair: analysis of contemporary United States experience reported to the society of thoracic surgeons national cardiac database, . . . (2003) Ann. Thorne. Surg., 75:820-825.

Speziali, G. et al., "Co!l'ection of Mitral Valve Regurgitation by Off-Pump, Transapical Placement of Artificial Chordae Tendinae, Results of the European TACT Trial," AATS 93rd Annual Meeting 2013, www.aats.org, 26 pages.

Suematsu, Y. et al., "Three-dimensional echo-guided beating heaii surgery without cardiopulmonary bypass: Atrial septa! defect closure in a swine model," (2005) J. Thorne. Cardiovasc. Surg., 130: 1348-1357.

Von Oppell, U. 0. et al., "Chordal replacement for both minimally invasive and conventional mitral valve surgery using promcasurcd Gore-Tex loops," (2000) Ann. Thorne. Surg., 70(6):2166-2168.

Zussa, C. et al., Artificial mitral valve chordae: experimental and clinical experience;—( 1990) Ann. Thorne. Surg., 50 (3):367-373.

Zussa, C. et al., "Seven-year experience with chordal replacement with expanded polytetrafluoroethylene in floppymitral valve," (1994)1. Thorac. Cardiovasc. Surg., 108(1):37-41.

Zussa, C. et al., "Surgical technique for artificial mitral chordae implantation," (1991) Journal of Cardiac Surgery, 6 (4):432-438.

Zussa, C., "Artificial chordae," (1995) J. Heart Valve Dis., 4(2):S249-S256.

\* cited by examiner

Ventricle view

Ventricle view

IMPLANTING GRAFTS TO VALVE LEAFLETS FOR CARDIAC PROCEDURES

CROSS REFERENCE TO RELATED APPLICATION

This application claims the benefit of U.S. Patent Application No. 63/147,918, filed Feb. 10, 2021, the entire disclosure which is incorporated by reference for all purposes.

BACKGROUND

Field

Described herein are methods and apparatus for implanting grafts to leaflets for cardiac valve repairs.

Description of Related Art

Various disease processes can impair the proper functioning of one or more of the valves of the heart. These disease processes include degenerative processes (e.g., Barlow's disease, fibroelastic deficiency), inflammatory processes (e.g., rheumatic heart disease), and infectious processes (e.g., endocarditis). Additionally, damage to the ventricle from prior heart attacks (e.g., myocardial infarction secondary to coronary artery disease) or other heart diseases (e.g., cardiomyopathy) can distort the geometry of the heart causing valves in the heart to dysfunction. The vast majority of patients undergoing valve surgery, such as mitral valve surgery, suffer from a degenerative disease that causes a malfunction in a leaflet of the valve, which results in prolapse and regurgitation.

Generally, a heart valve may malfunction in two different ways. One possible malfunction, valve stenosis, occurs when a valve does not open completely and thereby causes an obstruction of blood flow. Typically, stenosis results from buildup of calcified material on the leaflets of the valves causing the leaflets to thicken, thereby impairing their ability to fully open and permit adequate forward blood flow.

Another possible malfunction, valve regurgitation, occurs when the leaflets of the valve do not close completely thereby allowing blood to leak back into the prior chamber when the heart contracts. There are three mechanisms by which a valve becomes regurgitant or incompetent; they include Carpentier's type I, type II and type III malfunctions. A Carpentier type I malfunction involves the dilation of the annulus such that the area of the valve orifice increases. The otherwise normally functioning leaflets do not have enough surface area to cover the enlarged orifice and fail to form a tight seal (e.g., do not coapt properly) causing regurgitation. Included in a type I mechanism malfunction are perforations of the valve leaflets, as in endocarditis. A Carpentier's type II malfunction involves prolapse of a segment of one or both leaflets above the plane of coaptation. This is the most commonly treated cause of mitral regurgitation and is often caused by the stretching or rupturing of chordae tendineae normally connected to the leaflet. A Carpentier's type III malfunction involves restriction of the motion of one or more leaflets such that the leaflets are abnormally constrained below the level of the plane of the annulus. Leaflet restriction can be caused by rheumatic heart disease (IIIa) or dilation of the ventricle (IIb).

Mitral valve disease is the most common valvular heart disorder, with nearly 4 million Americans estimated to have moderate to severe mitral valve regurgitation ("MR"), with similar numbers of individuals impacted outside of the United States. MR results in a volume overload on the left ventricle which in turn progresses to ventricular dilation, decreased ejection performance, pulmonary hypertension, symptomatic congestive heart failure, atrial fibrillation, right ventricular dysfunction and death. Successful surgical mitral valve repair restores mitral valve competence, abolishes the volume overload on the left ventricle, improves symptom status, and prevents adverse left ventricular remodeling. While generally safe and effective, conventional open-heart operations are invasive, result in significant disability, and require extended post-procedure recovery. Patients routinely spend five to seven days in the hospital and often are not able to return to normal daily activities for a month or more.

Malfunctioning valves may either be repaired or replaced. Repair typically involves the preservation and correction of the patient's own valve. Replacement typically involves replacing the patient's malfunctioning valve with a biological or mechanical substitute. Typically, replacement is preferred for stenotic damage sustained by the leaflets because the stenosis is irreversible. The mitral valve and tricuspid valve, on the other hand, are more prone to deformation. Deformation of the leaflets, as described above, prevents the valves from closing properly and allows for regurgitation or back flow of blood from the ventricle into the atrium, which results in valvular insufficiency. Deformations in the structure or shape of the mitral valve or tricuspid valve are often repairable.

In many instances of mitral valve regurgitation, repair is preferable to valve replacement. Mitral valve replacement operations have a 2× higher risk of operative mortality (risk standardized mortality 1.65% vs. 2.96%), 2× higher risk of stroke per year (1.15% vs. 2.2%) and a lox higher risk of infection per year (0.1% vs. 1.0%). Patients who receive a quality mitral valve repair operation do not require anticoagulation and rarely require reoperation. This is in stark contrast to mechanical valve replacement which mandates lifelong anticoagulation and bioprosthetic valve replacement with the eventual certainty of prosthetic valve dysfunction and reoperation. Compared to mitral valve replacement, mitral valve repair results in improved left ventricular function and has superior long-term survival. Therefore, an improperly functioning mitral valve or tricuspid valve is ideally repaired, rather than replaced. Because of the complex and technical demands of the current repair procedures, however, the mitral valve is still replaced in approximately one third of all mitral valve operations performed in the United States.

Studies suggest that Carpentier type II malfunction, often referred to as "degenerative," "primary" or "organic" MR, accounts for as much as 60% of MR. Resectional mitral valve repair techniques, initially described by Dr. Carpentier, involve cutting out (resecting) a section of the prolapsed leaflet tissue, stitching the remaining tissue together and implanting an annuloplasty ring around the annulus. Removing a portion of one or both of the mitral valve leaflets during such a resectional repair decreases the available leaflet tissue to seal the mitral orifice. To accommodate the decrease caused by the resectional repair, in many instances, an annuloplasty ring must be implanted to decrease the size of the mitral orifice.

Implanting an annuloplasty ring introduces various risks. For example, implanting an annuloplasty ring can increase pressure gradients across the valve. Further, an annuloplasty ring can lead to infection and/or annuloplasty ring dehiscence—a well-documented failure mode of valve repair surgery. Implanting an annuloplasty ring can further impact the dynamic nature of the mitral valve annulus throughout the cardiac cycle. In a healthy person, for example, the mitral valve annulus relaxes during diastole and contracts with the rest of the left ventricle during systole, causing the annulus to expand and contract as the heart beats. Implanting an annuloplasty ring can interfere with such normal functioning of the heart. To combat such interference, flexible annuloplasty rings and partial bands have been developed to minimize the impact a rigid or complete annuloplasty ring can have on the dynamic movement of the mitral annulus. To avoid the aforementioned complications and risks, an effective mitral valve repair procedure that eliminated the need for an annuloplasty ring is desirable, particularly a repair that can be performed minimally-invasively and off-pump in which implanting an annuloplasty ring would be present technical challenges.

More recently many surgeons have moved to a "non-resectional" repair technique where artificial chordae tendineae ("cords") made of expanded polytetrafluoroethylene ("ePTFE") suture, or another suitable material, are placed in the prolapsed leaflet and secured to the heart in the left ventricle, normally to the papillary muscle. Because the native leaflet tissue is maintained in non-resectional repairs, they often result in a larger surface of coaptation between the posterior and anterior mitral valve leaflets, but properly sizing the cords on a flaccid heart can be very challenging, especially for the low volume mitral valve surgeon. Implanting an annuloplasty ring with such non-resectional repairs on a stopped heart is currently the standard of care. Implanting an annuloplasty ring in a beating heart repair is technically challenging and rarely done in practice due in large part to the costs associated with two separate procedures (e.g., cordal repair and annuloplasty). A device that can quickly and easily perform a beating-heart cordal repair while also addressing the mitral annulus would be a major advancement.

Carpentier type I malfunction, sometimes referred to as "secondary" or "functional" MR, is associated with heart failure and affects between 1.6 and 2.8 million people in the United States alone. Studies have shown that mortality doubles in patients with untreated mitral valve regurgitation after myocardial infarction. Unfortunately, there is no gold standard surgical treatment paradigm for functional MR and most functional MR patients are not referred for surgical intervention due to the significant morbidity, risk of complications and prolonged disability associated with cardiac surgery. Surgeons use a variety of approaches ranging from valve replacement to insertion of an undersized mitral valve annuloplasty ring for patients suffering from functional MR and the long-term efficacy is still unclear. In a randomized study of on-pump, open-heart mitral valve repair versus mitral valve replacement for functional MR, mitral valve replacement had a similar mortality rate and resulted in significantly less recurrent MR after one year and two years. According to some, a subsequent sub-analysis of subjects in the repair group suggests that the people who received a "good repair" did better than the replacement group but that when the repair arm was compared to mitral valve replacement, the "bad repairs" caused the replacement arm to perform better. Either way, there is a need for better treatment options for functional MR. Less invasive, beating-heart, transcatheter repair and replacement technologies are of particular interest because they do not require cardiopulmonary bypass, cardioplegia, aortic cross-clamping or median sternotomy.

Dr. Alfieri has demonstrated the benefit of securing the midpoint of both leaflets together creating a double orifice valve in patients with MR known as an "edge-to-edge" repair or an Alfieri procedure. The ability to combine a neochordal repair with an edge-to-edge repair in degenerative MR patients with a dilated annulus and who do not receive an annuloplasty ring because the repair is done in a minimally invasive, off-pump procedure, has particular promise. Further, performing a facilitated edge-to-edge repair in which sutures placed on both the posterior and anterior leaflets are secured together and then pulled toward the base of the heart has the potential to improve the overall repair. Performing a facilitated edge-to-edge procedure in a minimally-invasive beating-heart procedure is a further advancement. Further, in addition to or instead of creating the edge-to-edge relationship, to promote a larger surface of coaptation between the anterior and posterior leaflets, and thereby to promote proper valve function and limit or prevent undesirable regurgitation, sutures extending from the leaflets can be secured together to pull or to otherwise move the posterior annulus towards the anterior leaflet and/or the anterior annulus towards to posterior leaflet. This reduces the distance between the anterior annulus and the posterior annulus (or the septal-lateral distance) (e.g., by about 10%-30%). Approximating the anterior annulus and the posterior annulus in this manner can decrease the valve orifice, and thereby decrease, limit, or otherwise prevent undesirable regurgitation.

Regardless of whether a replacement or repair procedure is being performed, conventional approaches for replacing or repairing cardiac valves are typically invasive open-heart surgical procedures, such as sternotomy or thoracotomy, which require opening up of the thoracic cavity so as to gain access to the heart. Once the chest has been opened, the heart is bypassed and stopped. Cardiopulmonary bypass is typically established by inserting cannulae into the superior and inferior vena cavae (for venous drainage) and the ascending aorta (for arterial perfusion) and connecting the cannulae to a heart-lung machine, which functions to oxygenate the venous blood and pump it into the arterial circulation, thereby bypassing the heart. Once cardiopulmonary bypass has been achieved, cardiac standstill is established by clamping the aorta and delivering a "cardioplegia" solution into the aortic root and then into the coronary circulation, which stops the heart from beating. Once cardiac standstill has been achieved, the surgical procedure may be performed. These procedures, however, adversely affect almost all of the organ systems of the body and may lead to complications, such as strokes, myocardial "stunning" or damage, respiratory failure, kidney failure, bleeding, generalized inflammation, and death. The risk of these complications is directly related to the amount of time the heart is stopped ("cross-clamp time") and the amount of time the subject is on the heart-lung machine ("pump time").

Thus, there is a significant need to perform mitral valve repairs using less invasive procedures while the heart is still beating. Accordingly, there is a continuing need for new procedures and devices for performing cardiac valve repairs, such as mitral valve repair, which are less invasive, do not require cardiac arrest, and are less labor-intensive and technically challenging.

SUMMARY

Apparatus and methods for repairing a valve by implanting a graft to a valve leaflet are described herein. In some instances, apparatus and methods for performing a non-invasive procedure to repair a cardiac valve are described herein. In some instances, apparatus and methods are described herein for repairing a mitral valve by implanting a graft to the posterior or anterior leaflet to extend, to reinforce, and/or to patch the leaflet to which it is implanted. In some instances, apparatus and methods are described herein for repairing a mitral valve by implanting a graft to join the posterior and anterior leaflets to create an effect similar to a valve repaired using the Alfieri procedure.

In a first aspect, the present disclosure provides a method for implanting a graft on the ventricle-facing surface of a leaflet in a heart. The method includes installing an artificial cord having a distal anchor and a suture extending proximally from the distal anchor, the distal anchor deployed on an atrium-facing surface of a leaflet. The method also includes implanting an edge cord at an edge of a graft, the edge cord including an edge anchor and an edge suture extending from the edge anchor. The method also includes directing the graft along the artificial cord to a ventricle-facing surface of the leaflet. The method also includes deploying a mechanical fastener secure the graft to the ventricle-facing surface of the leaflet.

In some instances of the first aspect, the graft reduces mitral valve regurgitation. In some instances of the first aspect, the method is performed while the heart is beating. In some instances of the first aspect, the method further includes anchoring the suture, the edge suture, and the locking suture to an external wall of the heart.

In some instances of the first aspect, the mechanical fastener comprises a locking knot, the locking knot including a locking suture extending proximally from the locking knot. In further instances, the method further includes advancing the locking knot distally along the artificial cord to secure the graft to the ventricle-facing surface of the leaflet. In further instances, the suture, the edge suture, and the locking suture extend proximally through an opening in a wall of a ventricle.

In some instances of the first aspect, the method further includes adjusting a tension on the edge suture to adjust coaptation of the leaflet. In some instances of the first aspect, the graft is slidably coupled to the artificial cord outside of the heart prior to directing the graft along the artificial cord to the ventricle-facing surface of the leaflet. In some instances of the first aspect, the edge cord is implanted prior to directing the graft along the artificial cord. In some instances of the first aspect, the edge cord is implanted after directing the graft along the artificial cord.

In a second aspect, the present disclosure provides a method for implanting a graft on an atrium-facing surface of a leaflet. The method includes positioning a graft against the atrium-facing surface using a device positioned in an atrium of a heart. The method also includes installing an artificial cord having a distal anchor and a suture extending proximally from the distal anchor, the distal anchor deployed on an atrium-facing surface of the graft, the graft positioned against the atrium-facing surface of the leaflet. The method also includes deploying a locking knot on the artificial cord to secure the graft to the atrium-facing surface of the leaflet, the locking knot including a locking suture extending proximally from the locking knot. The method also includes implanting an edge cord at an edge of a graft, the edge cord including an edge anchor and an edge suture extending from the edge anchor.

In some instances of the second aspect, the graft reduces mitral valve regurgitation. In some instances of the second aspect, the method is performed while the heart is beating. In some instances of the second aspect, the method further includes anchoring the suture, the edge suture, and the locking suture to an external wall of the heart. In some instances of the second aspect, the method further includes advancing the locking knot distally along the artificial cord, the locking knot slidably coupled to the artificial cord outside a ventricle of the heart. In some instances of the second aspect, the method further includes adjusting a tension on the edge suture to adjust coaptation of the leaflet. In some instances of the second aspect, the suture, the edge suture, and the locking suture extend proximally through an opening in a wall of a ventricle. In some instances of the second aspect, the graft is slidably coupled to the artificial cord outside of the heart prior to directing the graft along the artificial cord to the ventricle-facing surface of the leaflet. In some instances of the second aspect, the edge cord is implanted prior to positioning the graft against the atrium-facing surface of the leaflet. In some instances of the second aspect, the edge cord is implanted after positioning the graft against the atrium-facing surface of the leaflet. In some instances of the second aspect, the method further includes implanting a compressible material between the graft and the atrium-facing surface of the leaflet.

In a third aspect, the present disclosure provides a method for implanting a graft on the atrium-facing surface of an anterior leaflet and a posterior leaflet. The method includes positioning a graft against the atrium-facing surface of the anterior leaflet and the atrium-facing surface of the posterior leaflet using a device positioned in an atrium of a heart, the graft including a slit to allow blood flow through the slit during a systolic phase of the cardiac cycle. The method also includes installing a first artificial cord having a first distal anchor and a first suture extending proximally from the first distal anchor, the first distal anchor deployed on the atrium-facing surface of the graft such that the first suture extends proximally through the graft and the anterior leaflet, the graft positioned against the atrium-facing surface of the anterior leaflet. The method also includes installing a second artificial cord having a second distal anchor and a second suture extending proximally from the second distal anchor, the second distal anchor deployed on the atrium-facing surface of the graft such that the second suture extends proximally through the graft and the posterior leaflet, the graft positioned against the atrium-facing surface of the posterior leaflet. The method also includes deploying a mechanical fastener to secure the graft to the atrium-facing surface of the anterior leaflet and the posterior leaflet.

In some instances of the third aspect, the method further includes implanting one or more edge cords at the slit of the graft. In some instances of the third aspect, the mechanical fastener comprises a locking knot on each of the first artificial cord and the second artificial cord, each locking knot including a locking suture extending proximally from the locking knot. In some instances of the third aspect, the graft reduces mitral valve regurgitation. In some instances of the third aspect, the method is performed while the heart is beating.

For purposes of summarizing the disclosure, certain aspects, advantages and novel features have been described herein. It is to be understood that not necessarily all such advantages may be achieved in accordance with any particular implementation. Thus, the disclosed examples may be carried out in a manner that achieves or optimizes one advantage or group of advantages as taught herein without necessarily achieving other advantages as may be taught or suggested herein.

DETAILED DESCRIPTION

Figure 1:
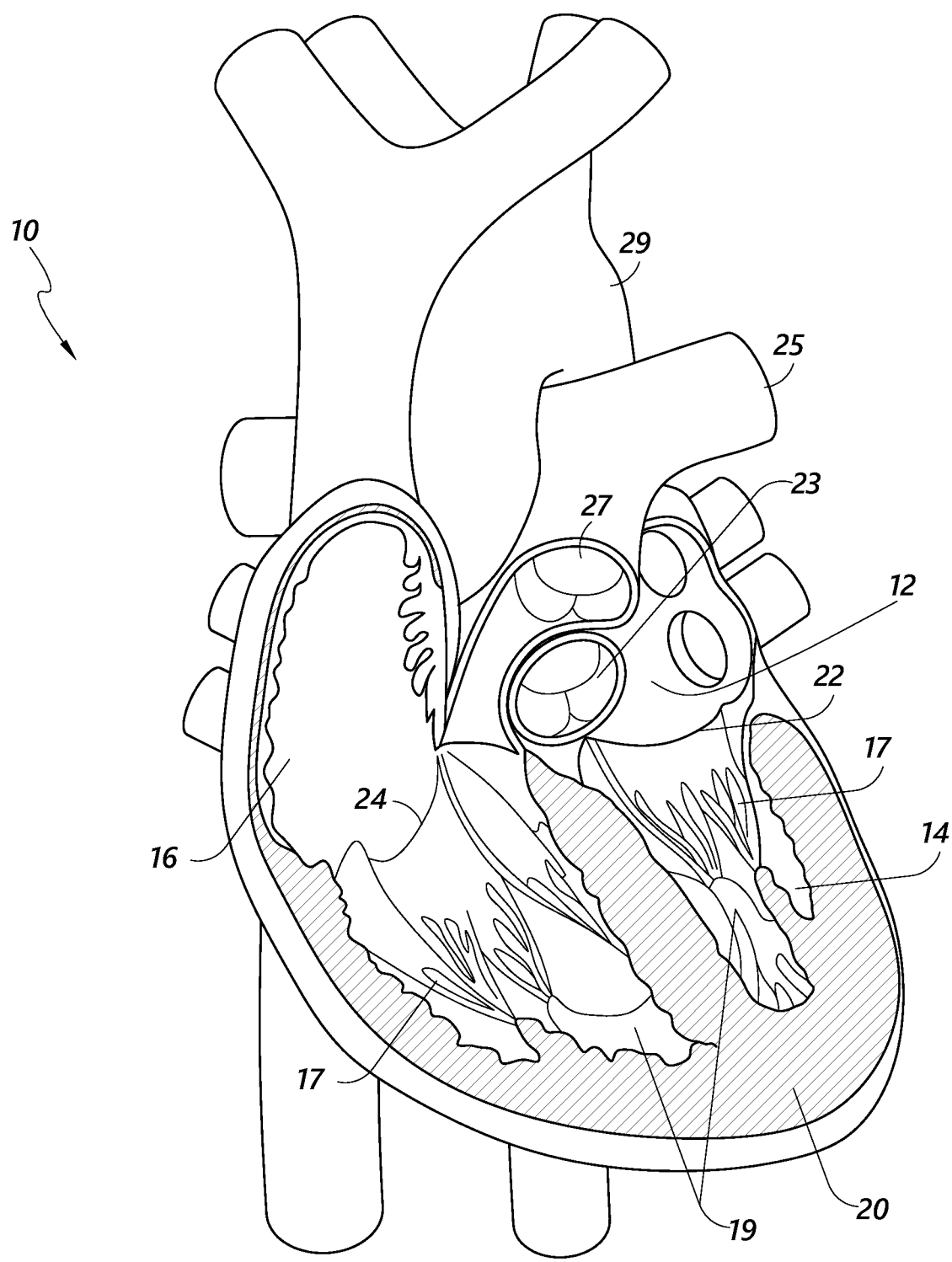
FIG. 1 illustrates a cut-away anterior view of a heart, showing the internal chambers, valves, and adjacent structures.

The headings provided herein, if any, are for convenience only and do not necessarily affect the scope or meaning of the disclosed subject matter.

Overview

During conventional, on-pump cardiac operations, the heart is stopped, and the doctor has vision of and direct access to the internal structures of the heart. In conventional operations, doctors perform a wide range of surgical procedures on a defective valve. In degenerative mitral valve repair procedures, techniques include, for example and without limitation, various forms of resectional repair, chordal implantation, and edge-to-edge repairs. Clefts or perforations in a leaflet can be closed and occasionally the commissures of the valve sutured to minimize or eliminate MR. Although devices have been developed to replicate conventional mitral valve procedures on a beating heart (see, e.g., International Patent Application No. PCT/US2012/043761, published as WO 2013/003228 A1, and referred to herein as "the '761 PCT Application") there is a need to expand the "toolbox" available to doctors during these minimally invasive procedures.

Typically, valve repair techniques require an overlap of leaflet tissue (or a tissue coaptation reserve) to enable coaptation after the repair. This requirement may reduce the potential population suited for valve repair procedures. The methods disclosed herein increase the patient population that is suited for minimally invasive valve repair procedures by implanting one or more grafts to a leaflet, or to both leaflets, of a valve. The grafts can elongate the leaflet to improve coaptation. Thus, the requirement for a tissue coaptation reserve is relaxed or eliminated.

The disclosed methods may also be advantageous due at least in part to the grafts reinforcing the leaflet to allow for anchors to be implanted in the leaflet. This enables patients with leaflets that have insufficient tissue thickness or inadequate tissue strength to receive procedures involving artificial cords or other procedures that require a minimum tissue thickness and/or strength. For example, where a leaflet lacks sufficient strength or thickness near the edge of the leaflet, procedures that implant artificial cords with anchors near the edge of the leaflet may fail or may not be available. In such instances, grafts can be implanted using anchors in a portion of the leaflet that is sufficiently thick and/or strong. These implanted grafts then reinforce the edge of the leaflet to enable implantation of anchors near the edge of the leaflet. Similarly, the disclosed methods may be advantageous due at least in part to the grafts providing a sufficiently strong location for the implantation of anchors to enable the implantation of artificial cords. In such instances, the anchors may be implanted through both the leaflet and the grafts or the edge of the grafts.

The disclosed methods may also be beneficial for patients with perforations of the valve leaflet. In such instances, the implanted grafts can act as a patch for the leaflet to reduce MR.

The methods disclosed herein include the use of one or more grafts or patches to extend and/or to repair valve leaflets. The disclosed methods can be performed using minimally invasive techniques while the heart is still beating. Grafts can be implanted to the leaflet from above, from below, or along the edge of the leaflet to extend, to reinforce, and/or to repair the leaflet tissue. The disclosed methods can use an approximately transapical approach, a transcatheter approach, an approach through the septum, an approach through the atrium, or an off-apex approach to implant the graft. Grafts can be attached to the leaflet using any suitable attachment mechanism. In certain instances, grafts can be attached to the leaflet using artificial cords and a deployable locking knot, mechanical fastener, staples, clips, anchors, hooks, barbs, adhesive, glue, welding, heat bonding, or suture. In some instances, in a minimally invasive procedure while the heart is beating, the graft is moved into place for implantation using rails, cords, or devices such as tubes with vacuum to secure the graft during movement and implantation.

In some instances, disclosed methods for repairing tissue includes inserting a delivery device, such as a delivery device described in the '761 PCT Application and/or in International Patent Application No. PCT/US2016/055170 (published as WO 2017/059426A1 and referred to herein as "the '170 PCT Application"), the entire disclosure of each of which is incorporated herein by reference, into a body and extending a distal end of the delivery device to a proximal side of the tissue. Advancement of the delivery device may be performed in conjunction with sonography or direct visualization (e.g., direct transblood visualization), and/or any other suitable remote visualization technique. Furthermore, one or more steps of the disclosed methods may also be performed in conjunction with any suitable remote visualization technique. With respect to the disclosed methods, one or more parts of a procedure may be monitored in conjunction with transesophageal (TEE) guidance or intracardiac echocardiography (ICE) guidance. For example, this may facilitate and direct the movement and proper positioning of the delivery device for contacting the appropriate target cardiac region and/or target cardiac tissue (e.g., a valve leaflet, a valve annulus, or any other suitable cardiac tissue). Typical procedures for use of echo guidance are set forth in Suematsu, Y., *J. Thorac. Cardiovasc. Surg.* 2005; 130:1348-56 ("Suematsu"), the entire disclosure of which is incorporated herein by reference.

As illustrated in FIG. 1, the human heart 10 has four chambers, which include two upper chambers denoted as atria 12, 16 and two lower chambers denoted as ventricles 14, 18. A septum 20 (see, e.g., FIG. 3) divides the heart 10 and separates the left atrium 12 and left ventricle 14 from the right atrium 16 and right ventricle 18. The heart further contains four valves 22, 23, 26, and 27. The valves function to maintain the pressure and unidirectional flow of blood through the body and to prevent blood from leaking back into a chamber from which it has been pumped.

Two valves separate the atria 12, 16 from the ventricles 14, 18, denoted as atrioventricular valves. The mitral valve 22, also known as the left atrioventricular valve, controls the passage of oxygenated blood from the left atrium 12 to the left ventricle 14. A second valve, the aortic valve 23, separates the left ventricle 14 from the aortic artery (aorta) 29, which delivers oxygenated blood via the circulation to the entire body. The aortic valve 23 and mitral valve 22 are part of the "left" heart, which controls the flow of oxygen-rich blood from the lungs to the body. The right atrioventricular valve, the tricuspid valve 24, controls passage of deoxygenated blood into the right ventricle 18. A fourth valve, the pulmonary valve 27, separates the right ventricle 18 from the pulmonary artery 25. The right ventricle 18 pumps deoxygenated blood through the pulmonary artery 25 to the lungs wherein the blood is oxygenated and then delivered to the left atrium 12 via the pulmonary vein. Accordingly, the tricuspid valve 24 and pulmonic valve 27 are part of the right heart, which control the flow of oxygen-depleted blood from the body to the lungs.

Both the left and right ventricles 14, 18 constitute pumping chambers. The aortic valve 23 and pulmonic valve 27 lie between a pumping chamber (ventricle) and a major artery and control the flow of blood out of the ventricles and into the circulation. The aortic valve 23 and pulmonic valve 27 have three cusps, or leaflets, that open and close and thereby function to prevent blood from leaking back into the ventricles after being ejected into the lungs or aorta 29 for circulation.

Both the left and right atria 12, 16 are receiving chambers. The mitral valve 22 and tricuspid valve 24, therefore, lie between a receiving chamber (atrium) and a ventricle to control the flow of blood from the atria to the ventricles and to prevent blood from leaking back into the atrium during ejection from the ventricle. Both the mitral valve 22 and tricuspid valve 24 include two or more cusps, or leaflets (not shown in FIG. 1), that are encircled by a variably dense fibrous ring of tissues known as the annulus (not shown in FIG. 1). The valves are anchored to the walls of the ventricles by chordae tendineae (chordae) 17. The chordae tendineae 17 are cord-like tendons that connect the papillary muscles 19 to the leaflets (not shown in FIG. 1) of the mitral valve 22 and tricuspid valve 24 of the heart 10. The papillary muscles 19 are located at the base of the chordae tendineae 17 and are within the walls of the ventricles. The papillary muscles 19 do not open or close the valves of the heart, which close passively in response to pressure gradients; rather, the papillary muscles 19 brace the valves against the high pressure needed to circulate the blood throughout the body. Together, the papillary muscles 19 and the chordae tendineae 17 are known as the sub-valvular apparatus. The function of the sub-valvular apparatus is to keep the valves from prolapsing into the atria when they close.

Figure 2A:
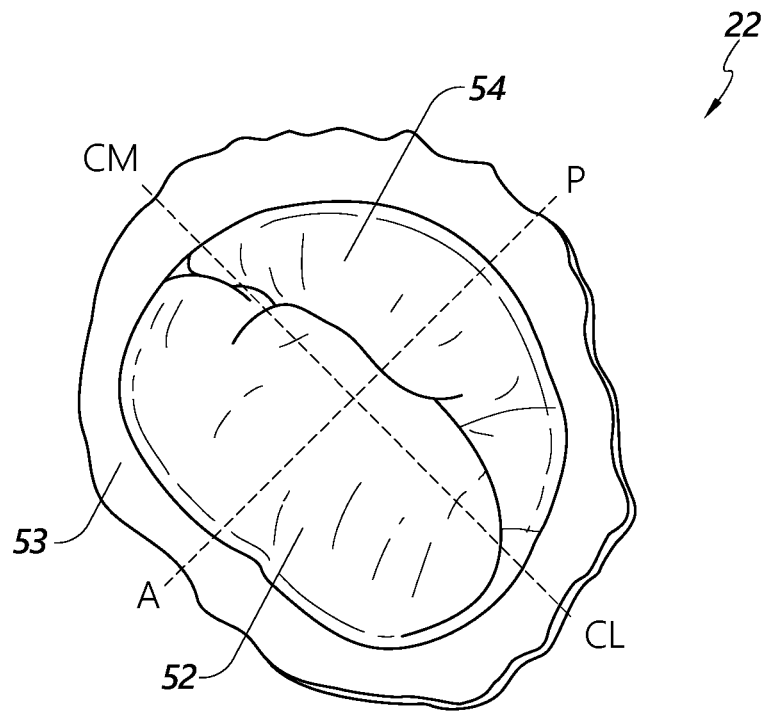
FIG. 2A illustrates a top perspective view of a healthy mitral valve with the mitral leaflets closed.

The mitral valve 22 is illustrated in FIG. 2A. The mitral valve 22 includes two leaflets, the anterior leaflet 52 and the posterior leaflet 54, and a diaphanous incomplete ring around the valve, called the annulus 53. The mitral valve 22 has two papillary muscles 19, the anteromedial and the posterolateral papillary muscles (see, e.g., FIG. 1), which attach the leaflets 52,54 to the walls of the left ventricle 14 via the chordae tendineae 17 (see, e.g., FIG. 1).

Figure 2B:
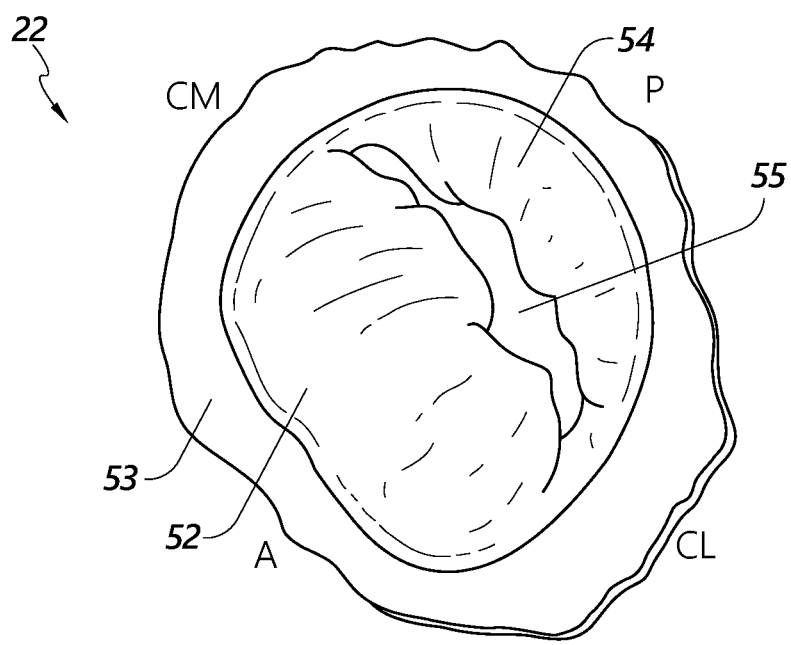
FIG. 2B illustrates a top perspective view of a dysfunctional mitral valve with a visible gap between the mitral leaflets.
Figure 2C:
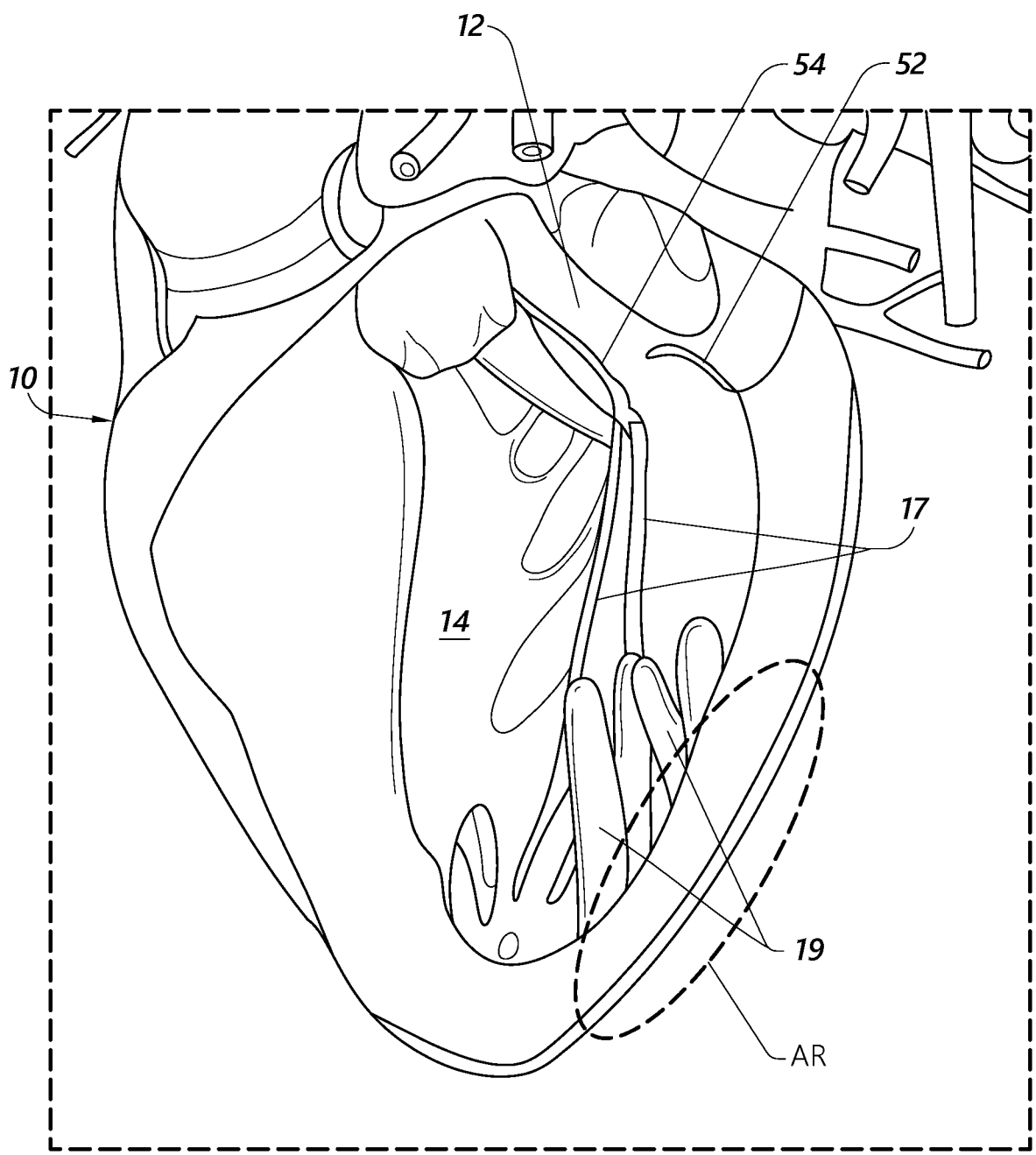
FIG. 2C illustrates a cross-sectional view of a heart illustrating a mitral valve prolapsed into the left atrium.
Figure 2D:
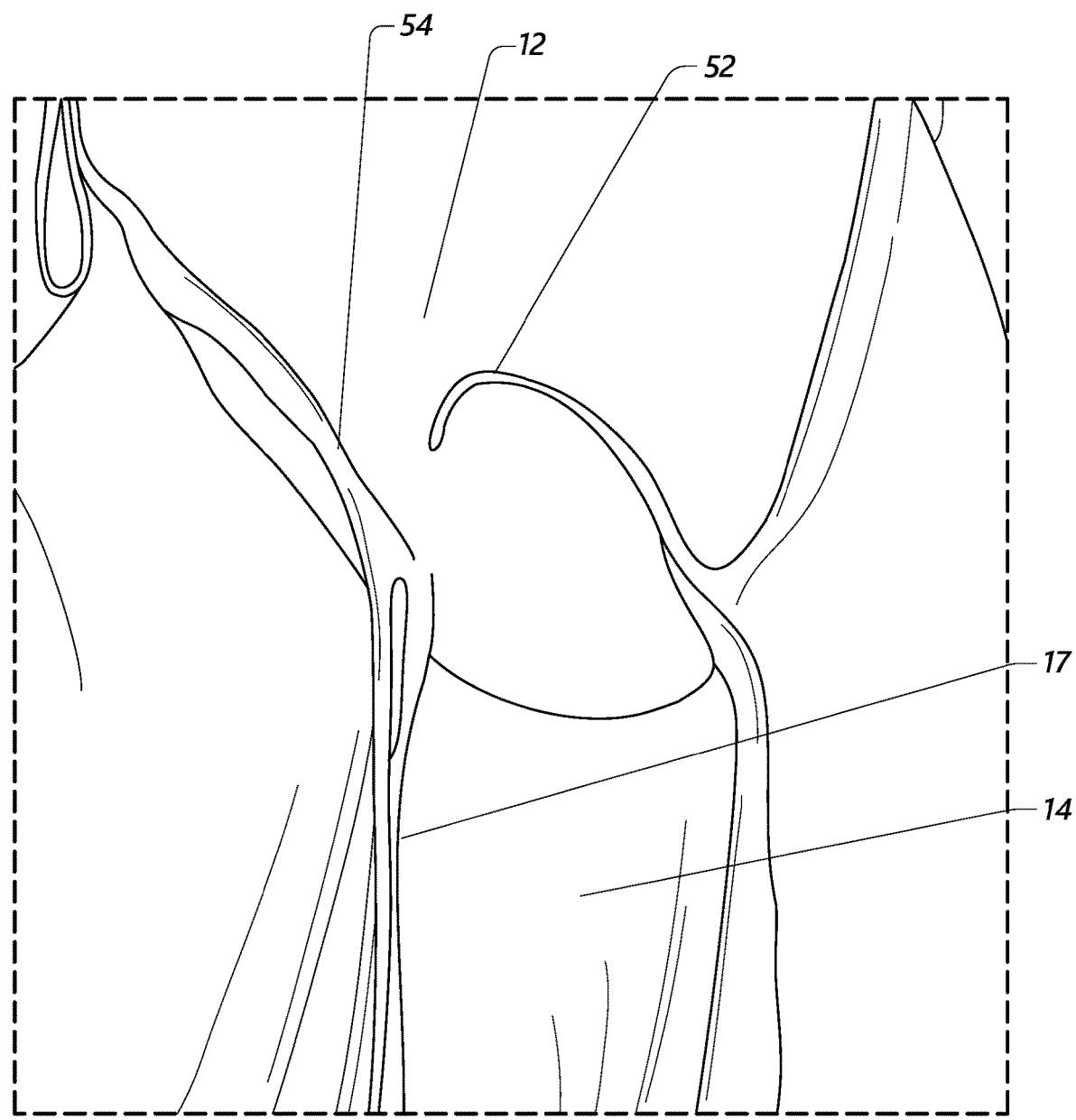
FIG. 2D illustrates an enlarged view of the prolapsed mitral valve of FIG. 2C.

FIG. 2B illustrates a prolapsed mitral valve 22. As can be seen with reference to FIGS. 2B-2D, prolapse occurs when a prolapsed segment of a leaflet 52, 54 of the mitral valve 22 is displaced above the plane of the mitral annulus into the left atrium 12 (see FIGS. 2C and 2D) preventing the leaflets from properly sealing together to form the natural plane or line of coaptation between the valve leaflets during systole. Because one or more of the leaflets 52,54 malfunctions, the mitral valve 22 does not close properly, and, therefore, the leaflets 52,54 fail to coapt. This failure to coapt causes a gap 55 between the leaflets 52,54 that allows blood to flow back into the left atrium, during systole, while it is being ejected by the left ventricle. As set forth above, there are several different ways a leaflet may malfunction, which can thereby lead to regurgitation.

Mitral valve regurgitation increases the workload on the heart and may lead to very serious conditions if left untreated, such as decreased ventricular function, pulmonary hypertension, congestive heart failure, permanent heart damage, cardiac arrest, and ultimately death. Since the left heart is primarily responsible for circulating the flow of blood throughout the body, malfunction of the mitral valve 22 is particularly problematic and often life threatening.

As described in detail in the '761 PCT Application and the '170 PCT Application, methods and devices are provided for performing non-invasive procedures to repair a cardiac valve, such as a mitral valve. Such procedures include procedures to repair regurgitation that occurs when the leaflets of the mitral valve do not coapt at peak contraction pressures, resulting in an undesired back flow of blood from the ventricle into the atrium. As described in the '761 PCT Application and the '170 PCT Application, after the malfunctioning cardiac valve has been assessed and the source of the malfunction verified, a corrective procedure can be performed. Various procedures can be performed in accordance with the methods described therein and described herein to effectuate a cardiac valve repair, which will depend on the specific abnormality and the tissues involved.

After prepping and placing the subject under anesthesia, a transesophageal echocardiogram (TEE) (2D or 3D), a transthoracic echocardiogram CITE), intracardiac echo (ICE), or cardio-optic direct visualization (e.g., via infrared vision from the tip of a 7.5 F catheter) may be performed to assess the heart and its valves.

After a minimally invasive approach is determined to be advisable, one or more incisions are made proximate to the thoracic cavity to provide a surgical field of access. The total number and length of the incisions to be made depend on the number and types of the instruments to be used as well as the procedure(s) to be performed. The incision(s) should be made in such a manner to be minimally invasive. As referred to herein, the term minimally invasive means in a manner by which an interior organ or tissue may be accessed with as little as possible damage being done to the anatomical structure through which entry is sought. Typically, a minimally invasive procedure is one that involves accessing a body cavity by a small incision of, for example, approximately 5 cm or less made in the skin of the body. The incision may be vertical, horizontal, or slightly curved. If the incision is placed along one or more ribs, it should follow the outline of the rib. The opening should extend deep enough to allow access to the thoracic cavity between the ribs or under the sternum and is preferably set close to the rib cage and/or diaphragm, dependent on the entry point chosen.

In one example method, the heart may be accessed through one or more openings made by a small incision(s) in a portion of the body proximal to the thoracic cavity, for example, between one or more of the ribs of the rib cage of a patient, proximate to the xyphoid appendage, or via the abdomen and diaphragm. Access to the thoracic cavity may be sought to allow the insertion and use of one or more thorascopic instruments, while access to the abdomen may be sought to allow the insertion and use of one or more laparoscopic instruments. Insertion of one or more visualizing instruments may then be followed by transdiaphragmatic access to the heart. Additionally, access to the heart may be gained by direct puncture (e.g., via an appropriately sized needle, for instance an 18-gauge needle) of the heart from the xyphoid region. Accordingly, the one or more incisions should be made in such a manner as to provide an appropriate surgical field and access site to the heart in the least invasive manner possible. Access may also be achieved using percutaneous methods further reducing the invasiveness of the procedure. See, for instance, "Full-Spectrum Cardiac Surgery Through a Minimal Incision Mini-Sternotomy (Lower Half) Technique," Doty et al., *Annals of Thoracic Surgery* 1998; 65(2): 573-7 and "Transxiphoid Approach Without Median Sternotomy for the Repair of Atrial Septal Defects," Barbero-Marcial et al., *Annals of Thoracic Surgery* 1998; 65(3): 771-4, the entire disclosures of each of which are incorporated herein by reference.

Once a suitable entry point has been established, the surgeon can use one or more sutures to make a series of stiches in one or more concentric circles in the myocardium at the desired location to create a "pursestring" closure. The Seldinger technique can be used to access the left ventricle in the area surrounded by the pursestring suture by puncturing the myocardium with a small sharp hollow needle (a "trocar") with a guidewire in the lumen of the trocar. Once the ventricle has been accessed, the guidewire can be advanced, and the trocar removed. A valved-introducer with dilator extending through the lumen of the valved-introducer can be advanced over the guidewire to gain access to the left ventricle. The guidewire and dilator can be removed and the valved-introducer will maintain hemostasis, with or without a suitable delivery device inserted therein, throughout the procedure. Alternatively, the surgeon can make a small incision in the myocardium and insert the valved-introducer into the heart via the incision. Once the valved-introducer is properly placed the pursestring suture is tightened to reduce bleeding around the shaft of the valved-introducer.

A suitable device such as a delivery device described in the '761 PCT Application and/or the '170 PCT Application, may be advanced into the body and through the valved-introducer in a manner to access the left ventricle. The advancement of the device may be performed in conjunction with sonography or direct visualization (e.g., direct transblood visualization). For example, the delivery device may be advanced in conjunction with TEE guidance or ICE to facilitate and direct the movement and proper positioning of the device for contacting the appropriate apical region of the heart. Typical procedures for use of echo guidance are set forth in Suematsu.

Figure 3:
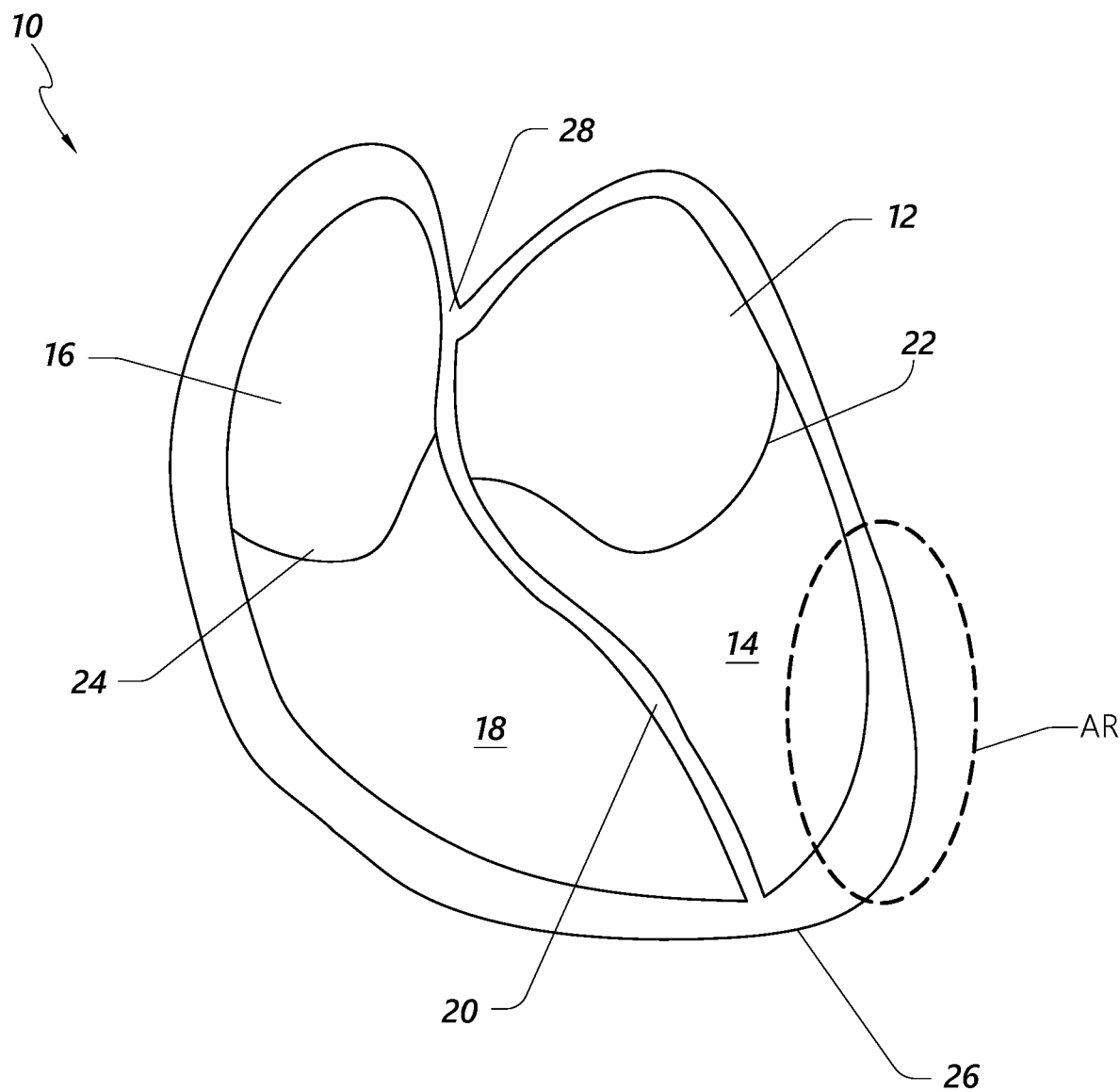
FIG. 3 illustrates a cross-sectional view of a heart showing the left atrium, right atrium, left ventricle, right ventricle, and the apex region.

As shown in FIG. 3, one or more chambers, e.g., the left atrium 12, left ventricle 14, right atrium 16, or right ventricle 18 in the heart 10 may be accessed in accordance with the methods disclosed herein. Access into a chamber 12, 14, 16, 18 in the heart 10 may be made at any suitable site of entry but is preferably made in the apex region of the heart, for example, slightly above the apex 26 at the level of the papillary muscles 19 (see also FIG. 2C). Typically, access into the left ventricle 14, for instance, to perform a mitral valve repair, is gained through the process described above performed in the apical region, close to (or slightly skewed toward the left of) the median axis 28 of the heart 10. Typically, access into the right ventricle 18, for instance, to perform a tricuspid valve repair, is gained through the process described above performed in the apical region, close to or slightly skewed toward the right of the median axis 28 of the heart 10. Generally, an apex region of the heart is a bottom region of the heart that is within the left or right ventricular region and is below the mitral valve 22 and tricuspid valve 24 and toward the tip or apex 26 of the heart 10. More specifically, an apex region AR of the heart (see, e.g., FIG. 3) is within a few centimeters to the right or to the left of the septum 20 of the heart 10 at or near the level of the papillary muscles 19. Accordingly, the ventricle can be accessed directly via the apex 26, or via an off-apex location that is in the apical or apex region AR, but slightly removed from the apex 26, such as via a lateral ventricular wall, a region between the apex 26 and the base of a papillary muscle 19, or even directly at the base of a papillary muscle 19 or above. Typically, the incision made to access the appropriate ventricle of the heart is no longer than about, for example, about 0.5 cm. Alternatively, access can be obtained using the Seldinger technique described above.

The mitral valve 22 and tricuspid valve 24 can be divided into three parts: an annulus (see 53 in FIGS. 2A and 2B), leaflets (see 52,54 in FIGS. 2A and 2B), and a sub-valvular apparatus. The sub-valvular apparatus includes the papillary muscles 19 (see FIG. 1) and the chordae tendineae 17 (see FIG. 1), which can elongate and/or rupture. If the valve is functioning properly, when closed, the free margins or edges of the leaflets come together and form a tight junction, the arc of which, in the mitral valve, is known as the line, plane or area of coaptation. Normal mitral and tricuspid valves open when the ventricles relax allowing blood from the atrium to fill the decompressed ventricle. When the ventricle contracts, chordae tendineae properly position the valve leaflets such that the increase in pressure within the ventricle causes the valve to close, thereby preventing blood from leaking into the atrium and assuring that all of the blood leaving the ventricle is ejected through the aortic valve (not shown) and pulmonic valve (not shown) into the arteries of the body. Accordingly, proper function of the valves depends on a complex interplay between the annulus, leaflets, and sub-valvular apparatus. Lesions in any of these components can cause the valve to dysfunction and thereby lead to valve regurgitation. As set forth herein, regurgitation occurs when the leaflets do not coapt properly at peak contraction pressures. As a result, an undesired back flow of blood from the ventricle into the atrium occurs.

Although the procedures described herein are with reference to repairing a cardiac mitral valve or tricuspid valve by the implantation of one or more grafts, the methods presented are readily adaptable for various types of tissue, leaflet, and annular repair procedures. In general, the methods herein are described with reference to a mitral valve 22 but should not be understood to be limited to procedures involving the mitral valve.

Repairing a cardiac valve (e.g., a mitral valve) by implanting one or more artificial cords is often influenced by a patient's particular anatomy. When the combined length of the posterior leaflet and the anterior leaflet is significantly larger than the A-P dimension of the mitral valve, the likelihood of a successful repair is significantly higher. For example, a patient having a large posterior leaflet is desirable, as a large posterior leaflet provides a large surface of coaptation with the anterior leaflet, thereby providing a sufficient seal when the leaflets coapt, e.g., to limit regurgitation. Conversely, a patient having a small posterior leaflet will have a relatively smaller surface of coaptation. Similarly, a patient having a large anterior leaflet can help lead to a desirable and successful repair. Typically, the effectiveness and durability of a repair of this nature is influenced greatly by the amount of anterior and posterior leaflet tissue coapting together during systole. Consequently, such valve repair techniques are typically less suited for patients with small anterior and/or posterior leaflets, or patients lacking tissue coaptation reserve.

The disclosed methods address these and/or other issues by implanting one or more grafts to the leaflet to elongate the leaflet. With the implanted grafts, patients lacking tissue coaptation reserve may benefit from implantation of artificial cords to address MR. The implanted grafts may also reinforce a leaflet that lacks sufficient tissue thickness or strength to support implantation of artificial cords. The implanted grafts may also patch a leaflet having one or more perforations.

Figure 4A:
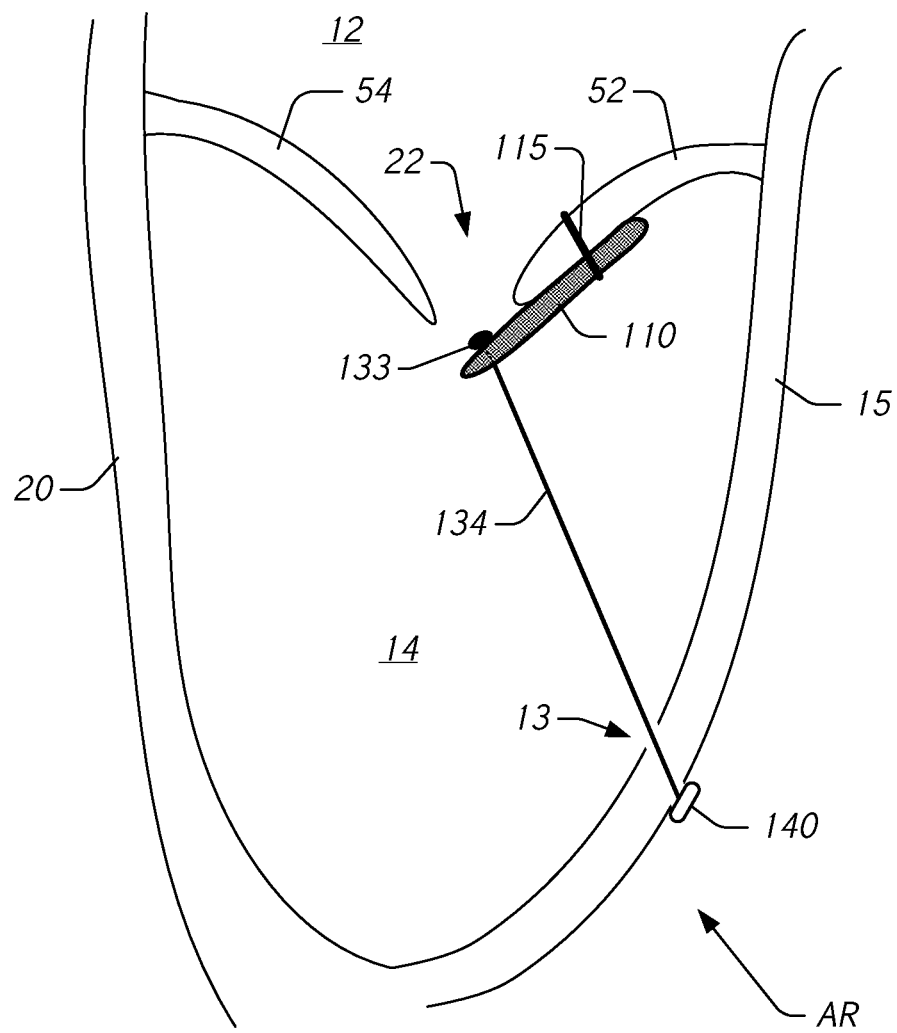
FIGS. 4A, 4B, 4C, and 4D illustrate examples of grafts implanted on a ventricle-facing surface of the anterior leaflet of the mitral valve for extending, reinforcing, and/or patching the leaflet.

FIG. 4A illustrates an example of a graft 110 implanted on a ventricle-facing surface of the anterior leaflet 52 of the mitral valve 22 for extending, reinforcing, and/or patching the leaflet 52. The graft 110 is implanted to the side of the leaflet 52 facing the ventricle 14. The graft 110 is configured to be secured to the leaflet 52 in a minimally invasive procedure while the heart is still beating. For example, the graft 110 can be introduced through the ventricle 14 near the apex region (AR) or using a transapical approach. The graft 110 can be implanted using other approaches such as a transcatheter approach or an approach through the septum 20.

The graft 110 can be maneuvered, positioned, and oriented for implantation using a variety of techniques. Some techniques include attaching anchors with cords to the leaflet 52 and then guiding the graft 110 into place using the attached cords. Similarly, rails or other similar components can be temporarily introduced into the ventricle 14. The graft 110 can then be slid along the rails to the leaflet 52 where it is then secured to the leaflet 52 using a mechanical fastener 115. Certain techniques include using a device to hold the graft 110 in place against or near the leaflet 52 to allow the fastener 115 to be implanted. The device can be, for example and without limitation, a tube or similar structure with the potential to create a vacuum or other suction force that holds the graft 110 against the device. The device can then be maneuvered to place the graft 110 at a targeted location for fastening to the leaflet 52. This can be done using feedback from visualization or other guidance systems, as described herein.

Figure 4B:
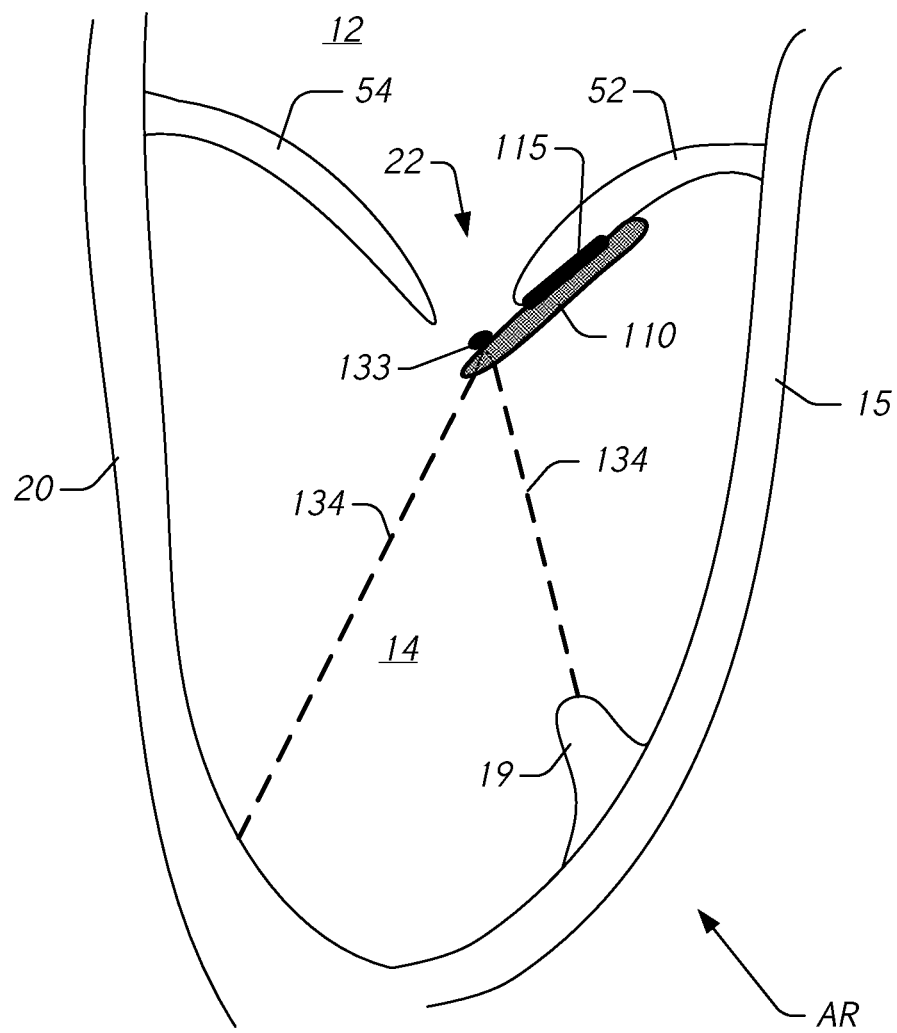

The graft 110 is attached to the leaflet 52 using the mechanical fastener 115. The mechanical fastener 115 can be any suitable fastener including, but not limited to, sutures, knots, staples, clips, anchors, hooks, barbs, adhesives, glue, welding, heat bonding, and the like. In some instances, the mechanical fastener 115 secures the graft 110 to the leaflet 52 by penetrating at least a portion of the graft 110 and at least a portion of the leaflet 52. In certain instances, as illustrated in FIG. 4B, the mechanical fastener 115 secures the graft to the leaflet 52 by adhering a portion of the graft 110 to a portion of the leaflet 52 using, for example and without limitation, adhesives, glue, welding, heat bonding, or the like. In various instances, a combination of fastening mechanisms can be used to secure the graft 110 to the leaflet 52.

In some instances, the graft 110 is configured to extend beyond an edge of the leaflet 52 to elongate the leaflet 52. This can be done to improve coaptation of the valve 22. In certain instances, the graft 110 reinforces the leaflet 52 to enable mitral valve repairs for a leaflet that lacks sufficient tissue thickness or strength. The fastener 115 can be attached to the leaflet 52 away from the edge of the leaflet 52 where the tissue is stronger and/or thicker. With the graft 110 fastened in this way, an artificial cord can be implanted at or near the edge of the graft 110 to reduce MR. In various instances, the graft 110 patches the leaflet 52 where the leaflet 52 has perforations.

An edge anchor 133 with an edge suture 134 can be attached to an edge of the graft 110. The edge anchor 133 with edge suture 134 acts as an artificial cord to repair the mitral valve 22 to improve coaptation. The edge anchor 133 and edge suture 134 can be a single component or it can be a composite component where the edge anchor 133 is attached to a distal end of the edge suture 134.

In some instances, the artificial cord (or cords) can be attached to the graft 110 prior to implanting the graft 110 to the leaflet 52. For example, the edge anchor 133 with the edge suture 134 can be attached to the graft 110 while outside of the heart. This advantageously facilitates implantation of one or more artificial cords. In certain instances, the graft 110 is implanted and the artificial cord (or cords) is implanted after the graft 110 is secured to the leaflet 52.

With reference to FIG. 4A, a proximal end of the edge suture 134 can be secured to an outer surface of the heart wall 15 at, for example, the apex region AR of the heart with a proximal anchor 140. The proximal anchor 140 can be, for example, a pledget, one or more knots, or other suitable anchoring device. The length of the edge suture 134 between the edge anchor 133 and the opening 13 in the heart can be adjusted until a desired length is established (e.g., coaptation is improved, MR is reduced or eliminated, etc.). In some instances, feedback from visualization systems, such as echo guidance, can be used to adjust the length of the edge suture 134 to improve coaptation prior to anchoring the edge suture 134 with the proximal anchor 140. With reference to FIG. 4B, the edge suture 134 can be attached to a papillary muscle 19 and/or to the septum 20.

In some instances, the graft 110 is secured to the leaflet 52 using the fastener 115 and does not include an artificial cord attached at an edge of the graft 110. Thus, in such instances, there is no cord in the ventricle 14.

Although the graft 110 is illustrated as being attached to the anterior leaflet 52, it should be understood that the graft 110 can be attached to the posterior leaflet 54 (see, e.g., FIGS. 13 and 14B) or to any other suitable leaflet to elongate, to reinforce, and/or to patch the leaflet. In addition, it is to be understood that a plurality of fasteners 115 may be used to secure the graft 110 to the leaflet 52. In such instances, the plurality of fasteners 115 can be varied and can be different from one another. In addition, it is to be understood that a plurality of artificial cords can be implanted at or near the edge of the graft 110 to reduce MR (e.g., to improve coaptation). In addition, it is to be understood that the graft 110 may comprise a plurality of grafts or pieces rather than a single unitary piece.

Figure 4C:
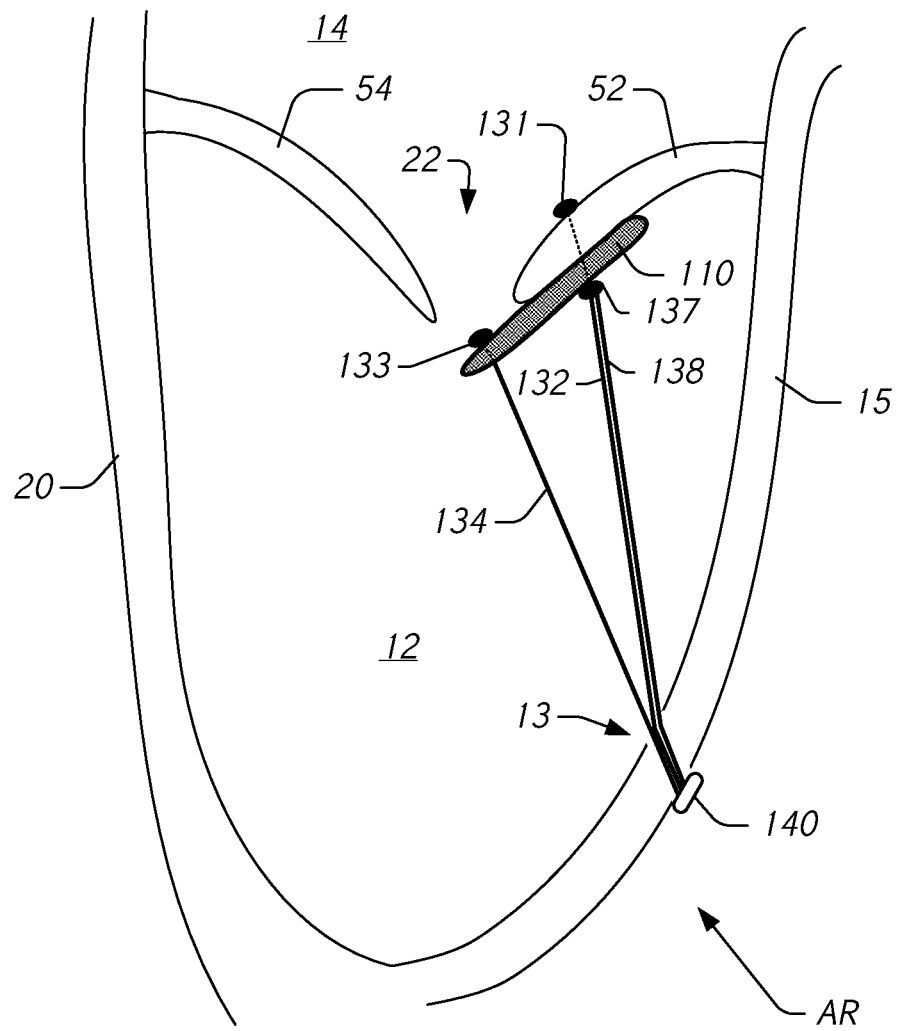

FIG. 4C illustrates an example of the graft 110 implanted on the leaflet 52 using artificial cords with distal anchors 131 and locking sutures 137 to secure the graft 110 to the leaflet 52. The implementation of FIG. 4C is similar to the implementation of FIGS. 4A and 4B where the mechanical fastener 115 of FIGS. 4A and 4B is replaced with artificial cords 132 having distal anchors 131 and one or more locking knots 137 each having a locking suture 138.

As described herein, the distal anchors 131 with sutures 132 can be attached to the leaflet 52 using the transapical approach through the opening 13 in the heart wall 15 near the apex region AR. Proximal ends of the sutures 132 can be threaded through holes in the graft 110 outside of the heart and the graft can slide along the sutures 132 through the opening 13 and up to the leaflet 52 for implantation. The proximal end of a suture 132 can be threaded through a locking knot 137 that is subsequently slid along the suture 132 to abut the graft 110. The locking knot 137 is pushed toward the leaflet 52 and deployed to secure the graft 110 to the ventricle side of the leaflet 52. The locking knot 137 includes a locking suture 138 extending proximally from the locking knot 137 and out the opening 13. Pulling the locking suture 138 can deploy the locking knot to secure the locking knot 137 to the suture 132 thereby securing the graft 110 in place. In certain implementations, a locking knot 137 is secured to each of a plurality of sutures 132 to attach the graft 110 to the leaflet 52. The edge anchor 133 can be attached at or near an edge of the graft 110 prior to implanting the graft 110 or after the graft 110 has been implanted.

The distal anchors 131 can be delivered and disposed on an atrial, distal, or top side of the leaflet 52. The distal anchors 131 can be formed with a suture material that forms a loop on the atrial, distal, or top side of the leaflets and extends through the leaflets, with two loose suture end portions 132 that extend on the ventricular, proximal, or bottom side of the leaflets. The distal anchors 131 can be pre-formed knots. The locking knot 137 can be any suitable mechanism to secure the graft 110 to the leaflet 52 and need not be a knot. For example, the locking knot 137 can any suitable mechanism that can be used to push the graft 110 into position against the leaflet 52 and to secure the graft 110 in place. Examples of forming distal anchors, pre-formed knots, and/or locking knots are presented in U.S. Pat. No. 8,852,213, International Publication. No. 2017/059426, and U.S. Patent Application Publication No. 2019/0117401, each of which is incorporated by reference herein in its entirety.

The distal anchors 131, the sutures 132, the locking knot 137, and/or the locking suture 138 can be formed of any suitable material. In some instances, for example, the material can be any one or more of expanded polytetrafluoroethylene ("ePTFE") sutures, polybutylate-coated polyester sutures, or polyester sutures (such as, for example, Ethibond EXCEL® polyester suture, Johnson & Johnson). In some instances, the locking knot 137 can be modified to increase its coefficient of friction to improve its locking capability. The suture material forming the distal anchors 131 and/or locking knot 137, ePTFE for example, can be braided, twisted, or knotted (e.g., with overhand knots) to form the distal anchors 131 and/or locking knot 137.

The graft 110, which can also be referred to as a prosthesis or patch, can be produced from a variety of materials such as animal, human, or synthetic tissue. The graft 110 can include a structure, such as a scaffolding-like structure, to promote tissue growth, such as a mesh made of ePTFE. Such a graft can promote formation of endothelial tissue at the site of the implant. Examples of suitable grafts are provided in U.S. Pat. No. 9,907,652, entitled "Heart Valve Sealing Devices," which is incorporated by reference herein in its entirety.

Figure 4D:
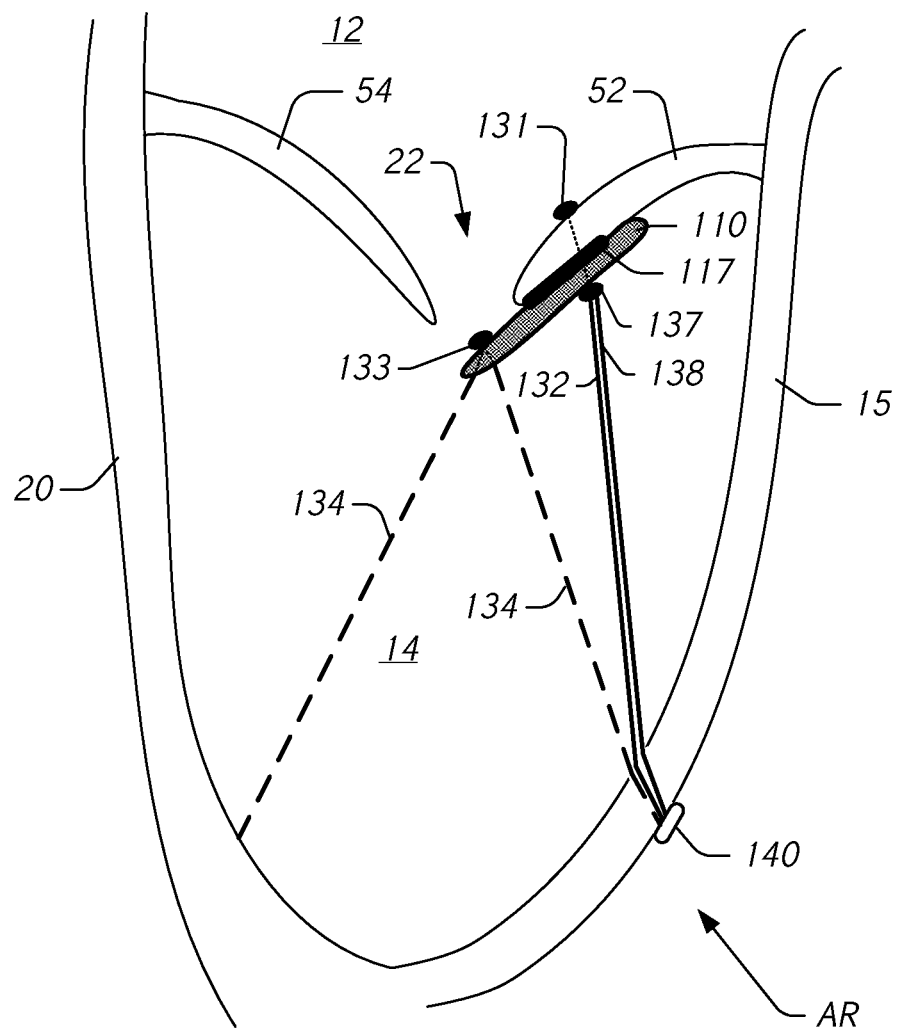

FIG. 4D illustrates an example of the graft 110 implanted on the leaflet 52 using artificial cords with distal anchors 131 and locking sutures 137 to secure the graft 110 to the leaflet 52 along with a compressible material 117 between the graft 110 and the leaflet 52. The implementation of FIG. 4D is similar to the implementation of FIG. 4C with the addition of the compressible material 117. As in FIGS. 4B and 4C, the edge suture 134 can be anchored with a proximal anchor 140 (e.g., a pledget), attached to a papillary muscle, and/or attached to the septum 20. The compressible material 117 can be secured to the graft 110 prior to implanting the graft 110 or the compressible material 117 can be secured to the leaflet prior to implanting the graft 110. In some embodiments, the compressible material 117 can be guided to the leaflet as described herein with reference to FIGS. 7-8I and 11. In some embodiments, the compressible material 117 can be secured in place temporarily with a tool as described herein with reference to FIGS. 9-10E and 12.

The compressible material 117 can be any suitable compressible material. The compressible material 117 extends across a portion of the graft 110 and may extend fully across the full length of the graft 110 (e.g., from P1 to P3). The compressible material 117 is configured to act as a seal between the graft 110 and the leaflet 52. For example, there is a limit to the number of distal anchors and locking knots that can be implanted in a leaflet, and this may lead to MR jets between the graft 110 and the leaflet 52. Although MR between the leaflets 52,54 would be reduced or prevented, there may be blood leaks or MR medial or lateral of the locations where the anchors 131, 137 are implanted. The compressible material 117 at the anchor locations 131, 137 is configured to be compressed. Lateral or medial to the anchors 131, 137 the compressible material 117 is configured to be less compressed or not compressed so that it acts as a seal between the graft 110 and the leaflet 52 to prevent blood leakage and/or MR at or near the sites of the anchors 131, 137. In some embodiments, the graft 110 itself can be made from a compressible material. In such embodiments, the graft 110 can compress at or near the sites of the anchors 131, 137 and decompress (at least partially) at or near the sites of the anchors 131, 137 to prevent or reduce MR medial or lateral to the anchor locations. It should be understood that the compressible material 117 can also be implanted between the graft 110 and the atrium-facing surface of a leaflet, such as in the examples described herein with reference to FIGS. 5A and 5B. It should also be understood that a compressible material 117 can be implanted between the graft 110 and each atrium-facing or ventricle-facing surface of each leaflet, such as in the examples described herein with reference to FIGS. 6A-6D.

Figure 5A:
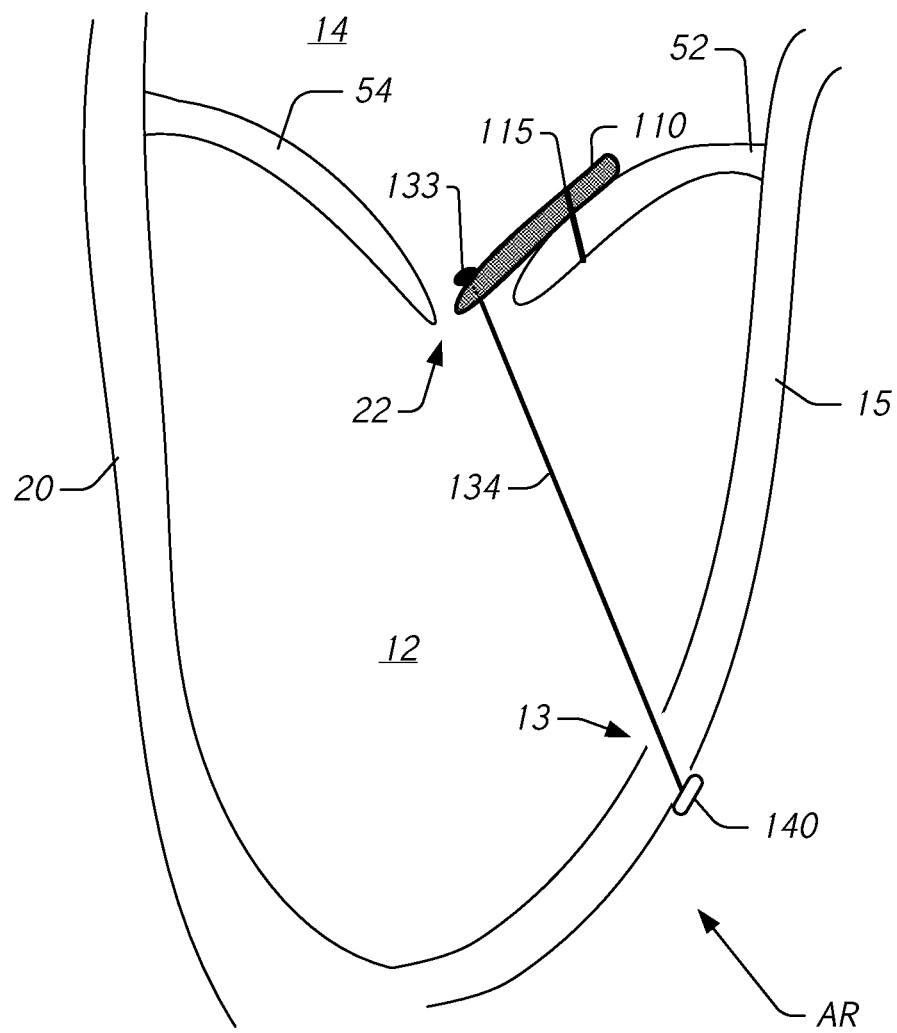
FIGS. 5A and 5B illustrate examples of grafts implanted on an atrium-facing surface of the anterior leaflet of the mitral valve for extending, reinforcing, and/or patching the leaflet.

FIG. 5A illustrates an example of the graft 110 implanted on an atrium-facing surface of the anterior leaflet 52 of the mitral valve 22 for extending, reinforcing, and/or patching the leaflet 52. The implementation of FIG. 5A is similar to that of FIG. 4A, using a mechanical fastener 115 to secure the graft 110 to the leaflet 52. In some instances, it may be advantageous to attach the graft 110 to the atrium-facing surface of the leaflet 52 rather than the ventricle-facing surface due at least in part to the graft 110 not potentially interfering with the native cords.

Figure 5B:
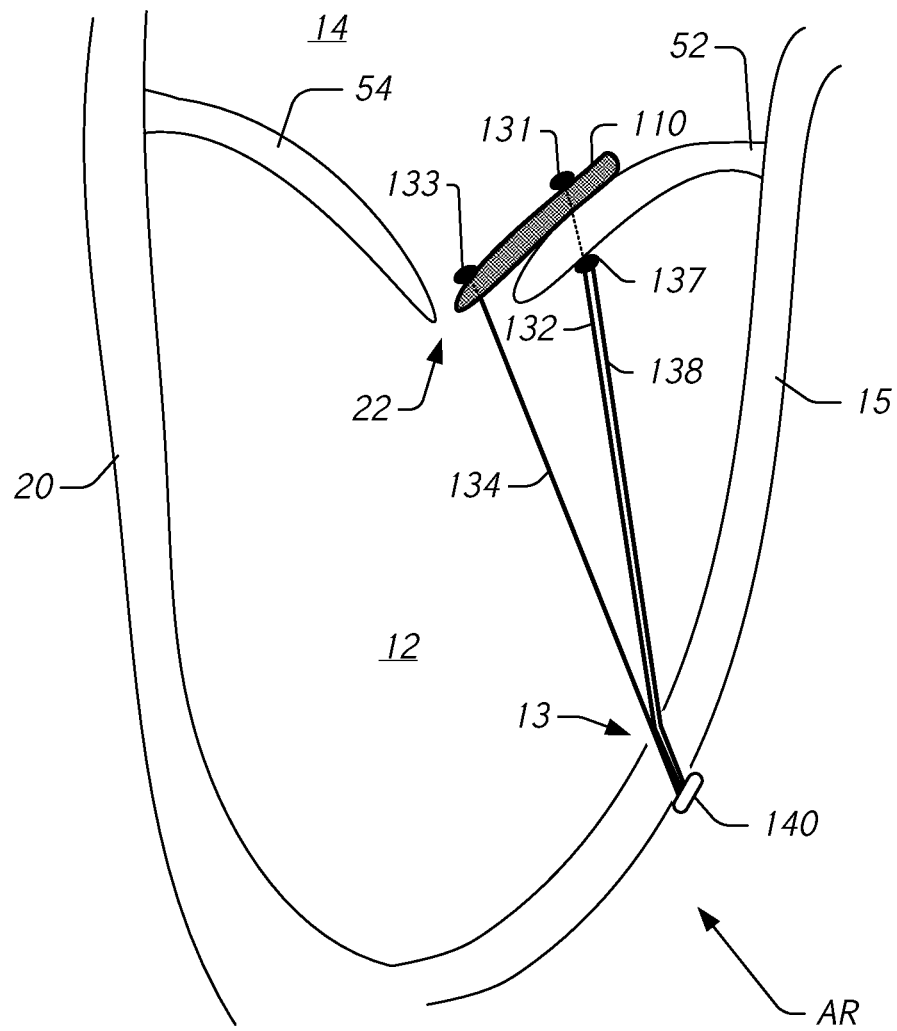

To implant the graft 110, a tool or device can be used to introduce the graft 110 through the opening 13 and to guide the graft 110 to the atrium-facing side of the leaflet 52. The tool can then be used to hold the graft 110 in position while the mechanical fastener 115 is deployed to secure the graft 110 to the atrium-facing surface of the leaflet 52. The fastener 115 can include, for example and without limitation, sutures, knots, staples, clips, anchors, hooks, barbs, adhesives, glue, welding, heat bonding, and the like FIG. 5B illustrates an example of the graft 110 implanted on the atrium-facing surface of the anterior leaflet 52 and secured to the leaflet 52 using distal anchors 131 and locking knots 137, similar to the implementation of FIG. 4C. In such implementations, the tool holds the graft 110 in position while the distal anchor 131 is deployed by penetrating both the leaflet 52 and the graft 110 from the ventricle, proximal, or bottom side of the leaflet 52. The locking knot 137 can then be slid along the sutures 132 to abut the ventricle-facing surface of the leaflet 52. When in position, the locking knot 137 can be deployed to secure the graft 110 to the atrium-facing surface of the leaflet 52.

FIGS. 6A-6D illustrate an example of the graft 110 implanted on both the anterior leaflet 52 and the posterior leaflet 54. The graft 110 can be used to join the posterior leaflet 54 and the anterior leaflet 52 together to create an effect similar to that achieved using an Alfieri procedure. The graft 110 includes a slit 111 to allow blood flow from the atrium 14 to the ventricle 12 during the systolic phase of the cardiac cycle.

Figure 6A:
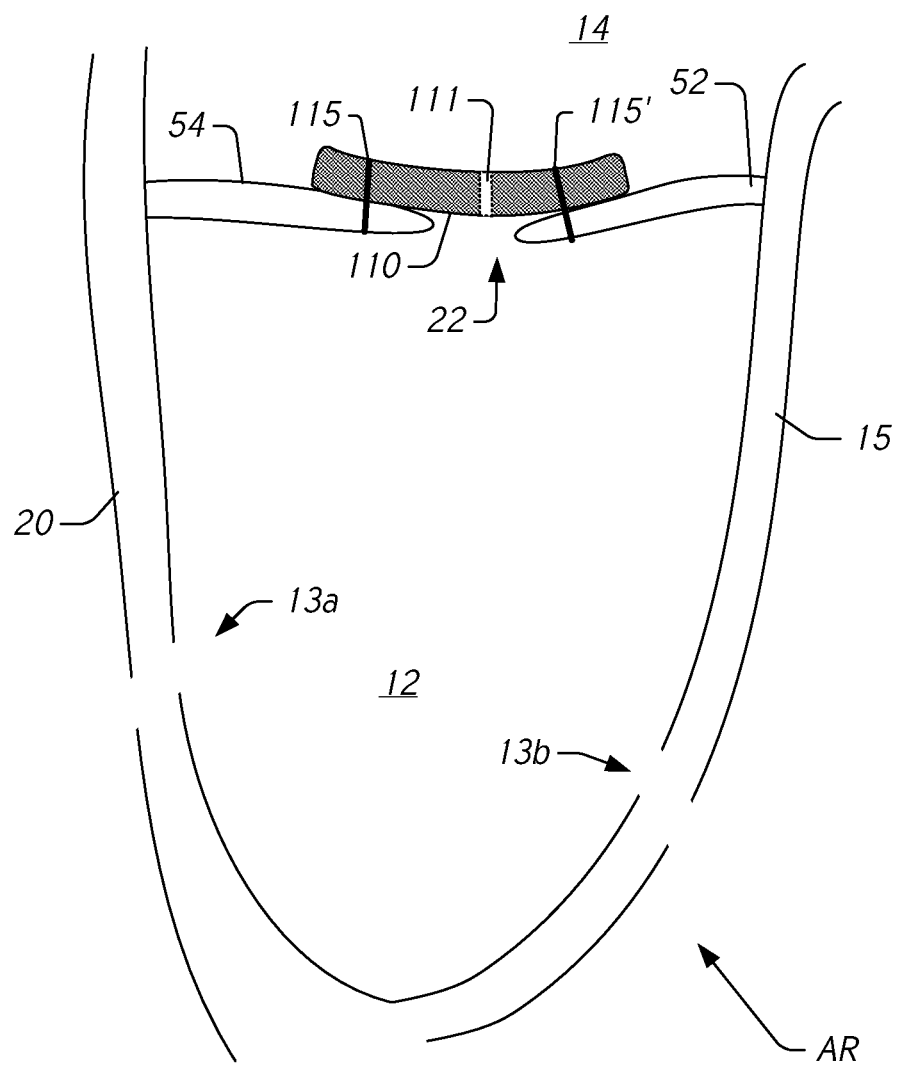
FIGS. 6A, 6B, 6C, and 6D illustrate examples of grafts implanted on both the anterior leaflet and the posterior leaflet.
Figure 6B:
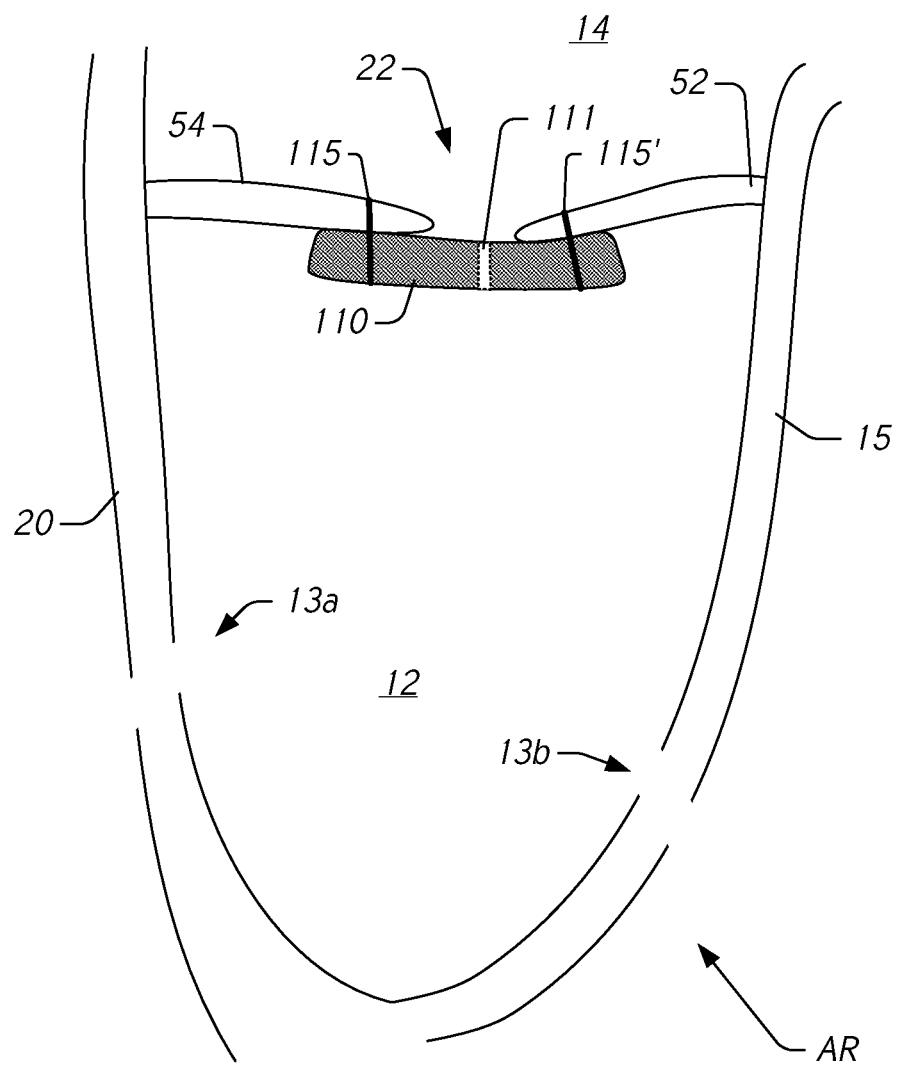
Figure 6C:
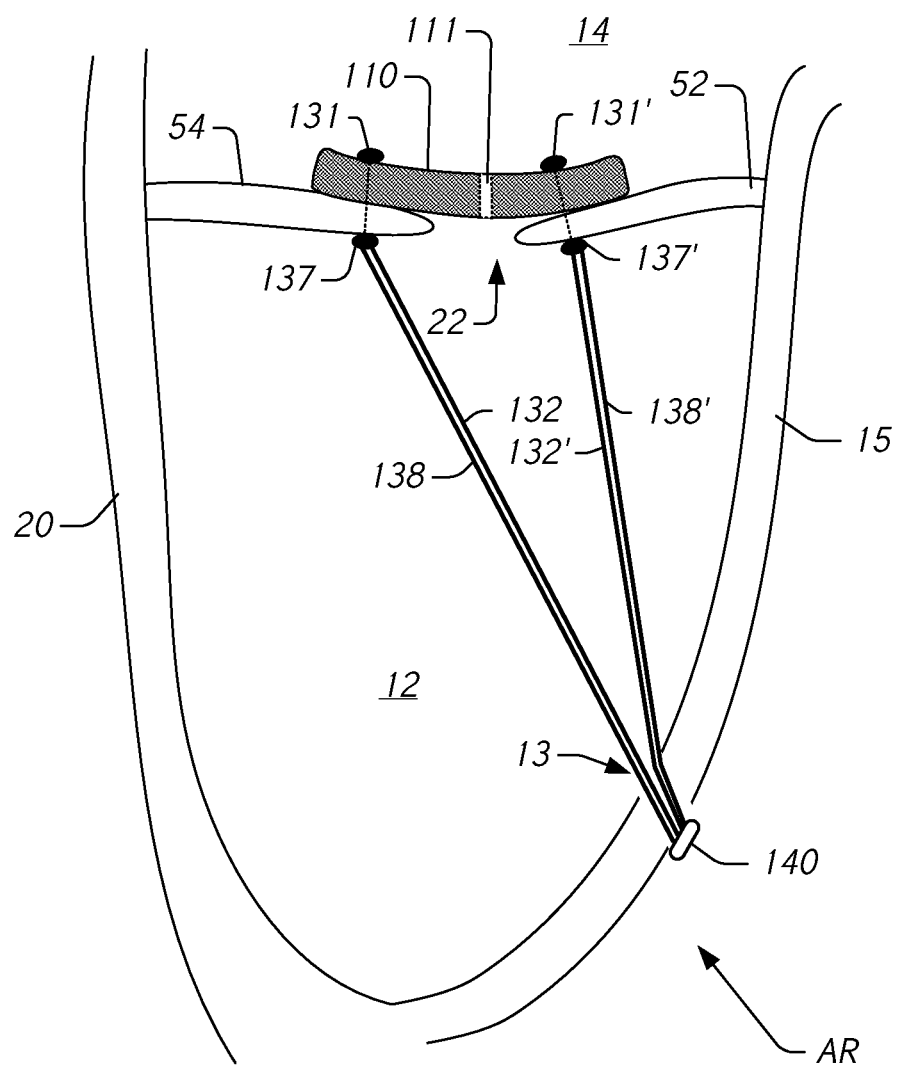
Figure 6D:
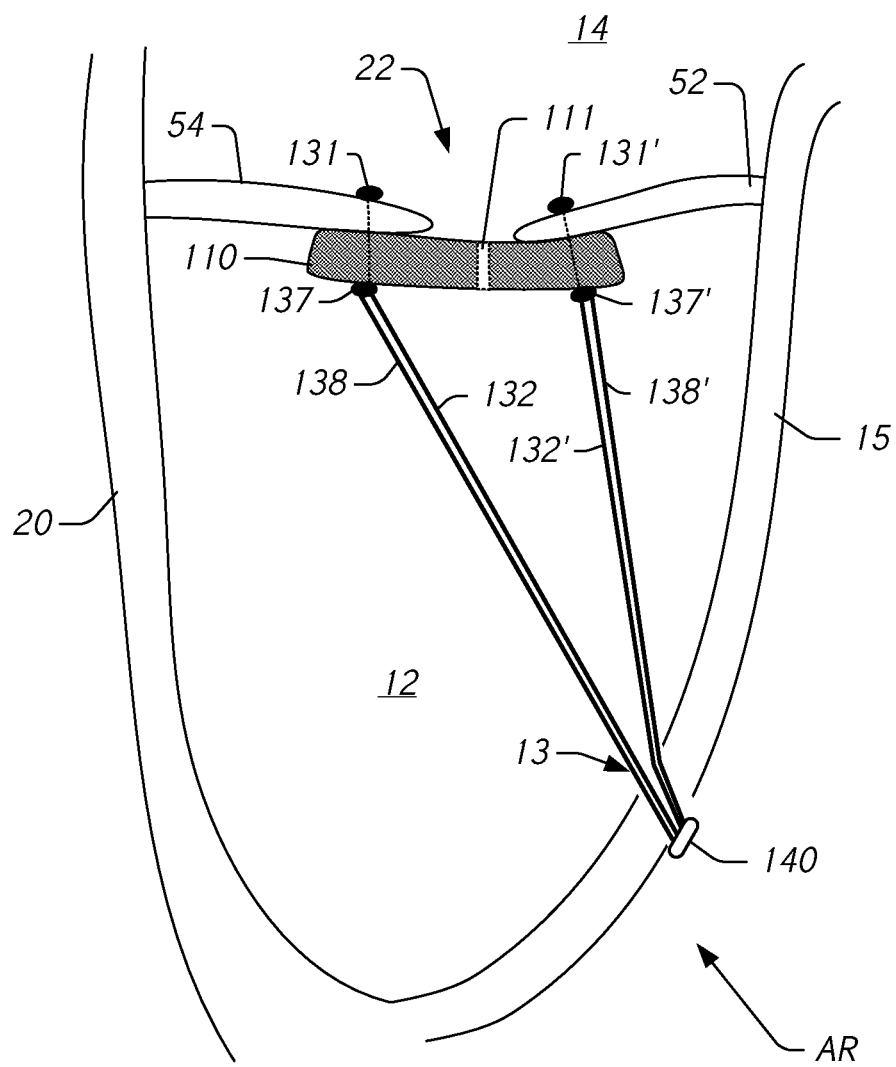

FIG. 6A illustrates that the graft 110 can be secured to the atrium-facing surfaces of the leaflets 52,54 using mechanical fasteners 115, 115', as described herein. FIG. 6B illustrates that the graft 110 can be secured to the ventricle-facing surfaces of the leaflets 52, 54 using mechanical fasteners 115, 115', as described herein. FIG. 6C illustrates that the graft 110 can be held in position on the atrium-facing surfaces of the leaflets 52, 54 using distal anchors 131, 131' with sutures 132, 132' and locking knots 137, 137' with locking sutures 138, 138' (similar to FIG. 5B). FIG. 6D illustrates that the graft 110 can be held in position on the ventricle-facing surfaces of the leaflets 52, 54 using distal anchors 131, 131' with sutures 132, 132' and locking knots 137,137' with locking sutures 138,138' (similar to FIG. 4C).

The graft 110 can be directed into place using any of the techniques described herein. For example, in the implementations of FIGS. 6A and 6C, a device can be used to introduce the graft 110 through the opening 13 and to direct the graft 110 to the atrium-facing surface of the leaflets 52, 54 where it is held in place while it is attached to the leaflets 52, 54 using the mechanical fasteners 115, 115' (FIG. 6A) or distal anchors 131, 131' (FIG. 6C). In the implementation of FIG. 6B, temporary rails can be used to slide the graft 110 into place against the ventricle-facing surfaces of the leaflets 52, 54 where it is then secured to the leaflets 52,54 using mechanical fasteners 115, 115'. Similarly, where the graft 110 is implanted to the ventricle-facing surface of the leaflets 52, 54 as in FIG. 6D, the sutures 132, 132' can be used as rails to slide the graft 110 into place with the assistance of the locking knots 137, 137' that then secure the graft 110 to the leaflets 52, 54.

The graft 110 can be designed to mimic or approximate the shape and/or size of the opening of the valve 22 after performing an edge-to-edge procedure with the Alfieri technique. Advantageously, the graft 110 can be used to achieve results similar to repairing the valve 22 using the Alfieri technique for patients that would otherwise be ineligible for that technique due to a lack of available leaflet tissue. Another advantage is that the graft 110 can be implanted while the heart is beating.

In some instances, the graft 110 can be implanted as described and one or more edge anchors could be added on either side of the slit 111. The edge anchors with edge sutures extending proximally therefrom, similar to the edge sutures 133 of FIGS. 4A-5B, can then be approximated to fine-tune the size of the opening of the slit 111. This could be done to improve coaptation and/or to reduce or eliminate MR. In certain implementations, the edge anchors can be approximated by threading the edge sutures through a locking knot and sliding the locking knot distally along the edge sutures until a desired approximation of the edge anchors has been achieved and then locking the locking knot.

Example Methods for Implanting a Graft to a Cardiac Valve

Figure 7:
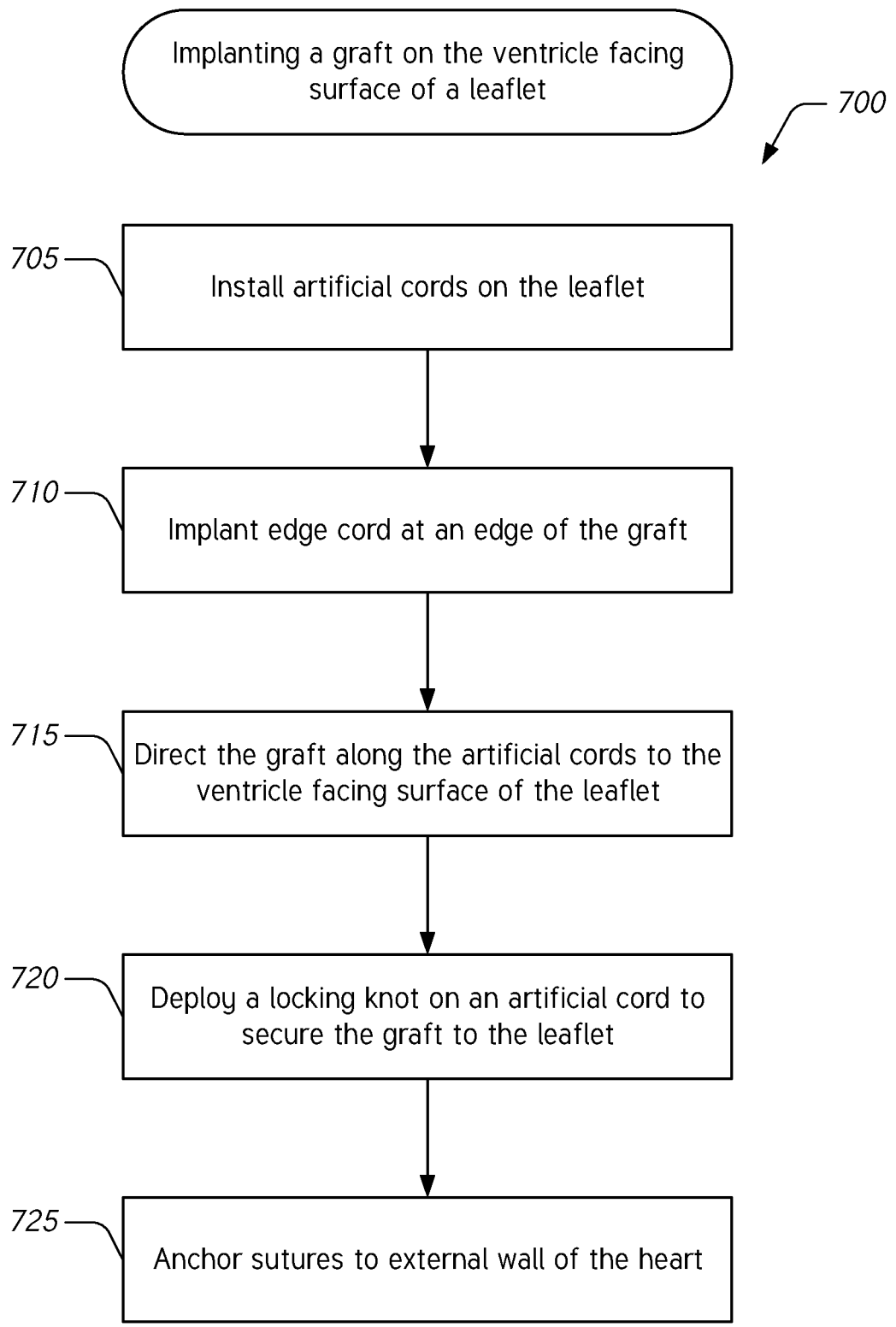
FIG. 7 illustrates a flow chart of an example method for implanting a graft on the ventricle-facing surface of a leaflet.

FIG. 7 illustrates a flow chart of an example method 700 for implanting a graft on the ventricle-facing surface of a leaflet. The method 700 can be performed to elongate, to reinforce, and/or to patch the leaflet. The method 700 can be performed to improve coaptation of the leaflets and/or to reduce regurgitation. The method 700 can be performed using a minimally invasive procedure while the heart is still beating. The method 700 is described as being performed on the anterior leaflet of the mitral valve but it is to be understood that the method 700 can be performed on the posterior leaflet of the mitral valve or on another valve. Furthermore, the method 700 can be performed to implant multiple grafts to a leaflet. Advantageously, the method 700 enables the graft to be guided into place from outside the heart using sutures anchored to the leaflet.

In block 705, artificial cords are installed in the leaflet. The artificial cords include anchors at a distal end that are anchored to the targeted tissue, e.g., a posterior or anterior leaflet. The cords also include sutures extending proximally from the anchors. These sutures extend proximally from the distal anchors to a region away and/or outside of the left ventricle or heart.

In some instances, the artificial cords can be installed using a delivery device. A piercing portion of such a delivery device can be used to form an opening in the leaflet tissue, through which the distal end of the delivery device can be inserted. The delivery device can be used to form or deliver a distal anchor to the distal side of the leaflet. The delivery device can then be withdrawn, and suture portions extending from the distal anchors can extend to an outside surface of the heart. Where the term anchor is used herein, it is to be understood that an anchor refers to any suitable component or element that serves to anchor a suture to tissue such as, for example and without limitation, hooks, barbs, knots (e.g., bulky knots), and the like.

In block 710, one or more edge anchors with edge sutures (edge anchors and edge sutures forming edge cords) are implanted on a pre-shaped and formed graft. The step of block 710 is described as preceding implanting the graft to the leaflet, but it should be understood that the step of block 710 could be performed after attaching the graft to the leaflet, similar to the method goo. The graft can be shaped and formed prior to implantation. The proximal ends of the edge sutures remain outside of the heart to allow the edge cords to be adjusted after implantation. Adjusting the edge cords can be done using visual guidance to improve coaptation and/or to reduce MR.

In block 715, the graft is directed along the sutures of the artificial cords to the ventricle-facing surface of the leaflet. The graft can be cut to a desired size and shape prior to implanting to the leaflet. The sutures of the artificial cords can be threaded through the graft outside the heart. The sutures of the artificial cords act as a guide or rail to slide the graft from outside the heart to under the leaflet.

In block 720, a locking knot is directed along the sutures of the artificial cords to position and to secure the graft against the leaflet. Proximal ends of the sutures of the artificial cords are threaded through a pre-formed locking knot. The locking knot then slides along the sutures to push against the graft. The locking knot is deployed to lock the position of the locking knot on the suture, thereby securing the graft in place against the leaflet. In some instances, additional deployable knots may be used to secure the graft to the leaflet. In certain instances, one or more sutures may not include a locking knot.

In some instances, the pre-formed locking knot includes a knot formed from a suture wherein the knot includes a plurality of cow hitches with ends of the knot suture being threaded through portions of the plurality of cow hitches so that, when the ends of the knot suture are tensioned, they axially and radially constrict to create a tortuous path for any suture tail ends threaded through the locking suture. In this way, the sutures and the locking knot are inhibited or prevented from relative movement. A device may be used to deploy the locking suture. The device can be configured to hold the pre-formed locking knot to allow one or more suture ends to be passed through or interweaved with the locking knot, to maneuver the locking knot with sutures to a targeted location, to allow the sutures to be adjusted, to tension the locking knot to lock the sutures (e.g., to inhibit relative motion between the sutures and the locking knot), and to release the locking knot in its deployed or locked state. The device can be operated from outside of the heart. The transition from the delivery configuration to the deployed configuration includes tightening the locking knot to inhibit relative motion between the locking knot and the sutures. By locking the locking knot to the sutures, relative motion between the graft and the sutures is also inhibited or prevented, thereby substantially securing the graft in place. This can be monitored and confirmed using various imaging techniques.

In block 725, the locking sutures, edge sutures, and anchor sutures are anchored to an external wall of the heart. The anchoring step can be done to prevent or to reduce the likelihood that the locked sutures will come loose. A pledget can be used as the anchor. For example, PTFE (Teflon®, Dupont, Wilmington, Delaware) felt can be used as an anchor where the felt is attached to the tissue wall. In some instances, the anchor includes a plurality of holes through which the sutures extend.

In instances where edge anchors and edge sutures are implanted on the edge of the graft after the graft has been secured to the leaflet, visual feedback can be used to assess regurgitation. The edge sutures can be adjusted to reduce MR prior to anchoring in the step of block 725. In some instances, the edge anchors placed near the free edge of the graft, and the edge sutures extending therefrom can be secured in a manner to improve coaptation of the anterior and posterior leaflets. In certain instances, the secured edge sutures can be suitably tensioned and/or pulled towards the access site and into the ventricle of the heart, resulting in a larger effective surface area of coaptation and improved coaptation between the leaflets.

Figure 8A:
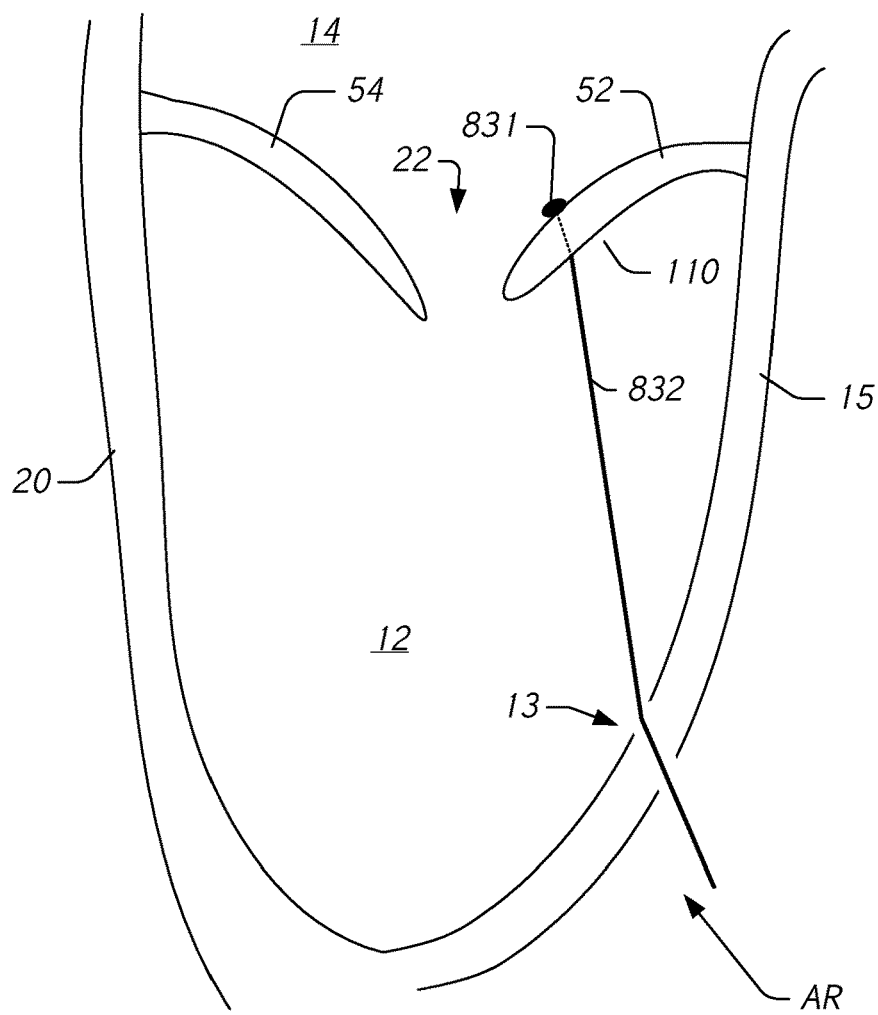
FIGS. 8A, 8B, 8C, 8D, 8E, 8F, 8G, 8H, and 8I illustrate steps in a procedure for implanting a graft on the ventricle-facing surface of a leaflet.
Figure 8B:
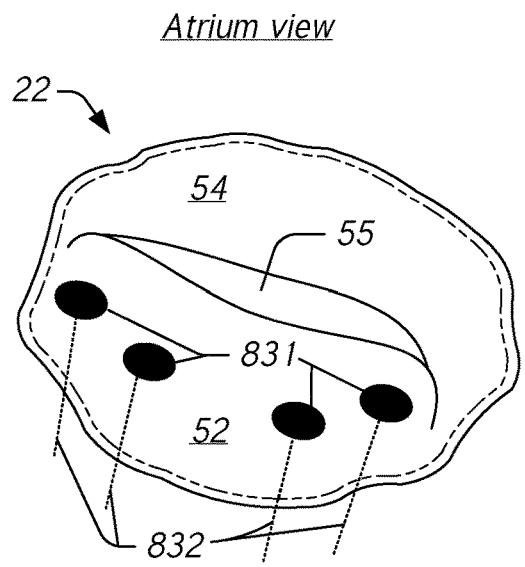
Figure 8C:
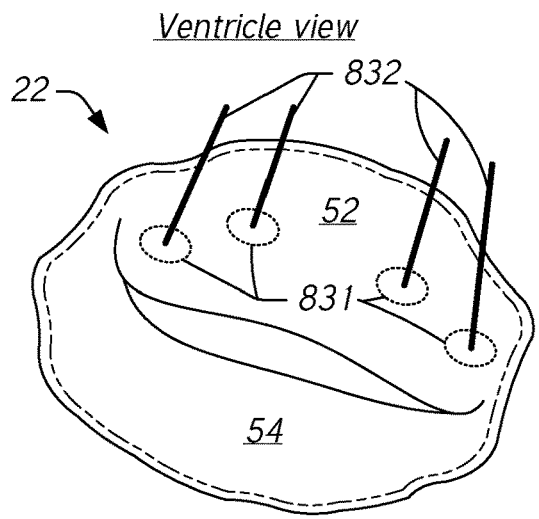

FIGS. 8A-8I illustrate steps in a procedure for implanting a graft 810 on the ventricle-facing surface of a leaflet 52. FIGS. 8A, 8B, and 8C illustrate distal anchors 831 installed on the leaflet 52, the distal anchors 831 including sutures 832 extending proximally therefrom. FIG. 8A illustrates a side view of a cross-section of the heart, FIG. 8B illustrates the mitral valve 22 as viewed from the atrium 14, and FIG. 8C illustrates the mitral valve 22 as viewed from the ventricle 12. The combination of the distal anchors 831 and the sutures 832 can be referred to as artificial cords. The distal anchors 831 can be implanted in the leaflet 52 as described herein. The sutures 832 can extend from the ventricle 12 to a region outside the heart through an opening 13 in the heart wall 15 near an apex region AR. These sutures 832 can be used to guide a graft to the ventricle-facing surface of the leaflet 52. FIG. 8A illustrates a transapical approach although it should be understood that other approaches may be used as well (e.g., transcatheter approach, approach through the septum, approach through the atrium, etc.).

The distal anchors 831 can be bulky knot anchors disposed on an atrial, distal, or top side of the leaflet 52. The distal anchors 831 can be formed with a suture material that forms one or more loops on the atrial side of the leaflet 52 and extends through the leaflet 52. Each distal anchor 831 may include two loose suture end portions that form a suture 832 for that distal anchor 831. The sutures 832 extend on the ventricular, proximal, or bottom side of the leaflet 52. Individual distal anchors 831 (or bulky knots) can be in the form of one or more multi-turn coils of their respective suture 832 that can be changed from an elongated configuration during delivery to a knot configuration by approximating opposite ends of the coil(s) towards each other, to form one or more loops. However, it is to be understood that other distal anchor configurations can be used to anchor the sutures 832 to the leaflet 52.

Figure 8D:
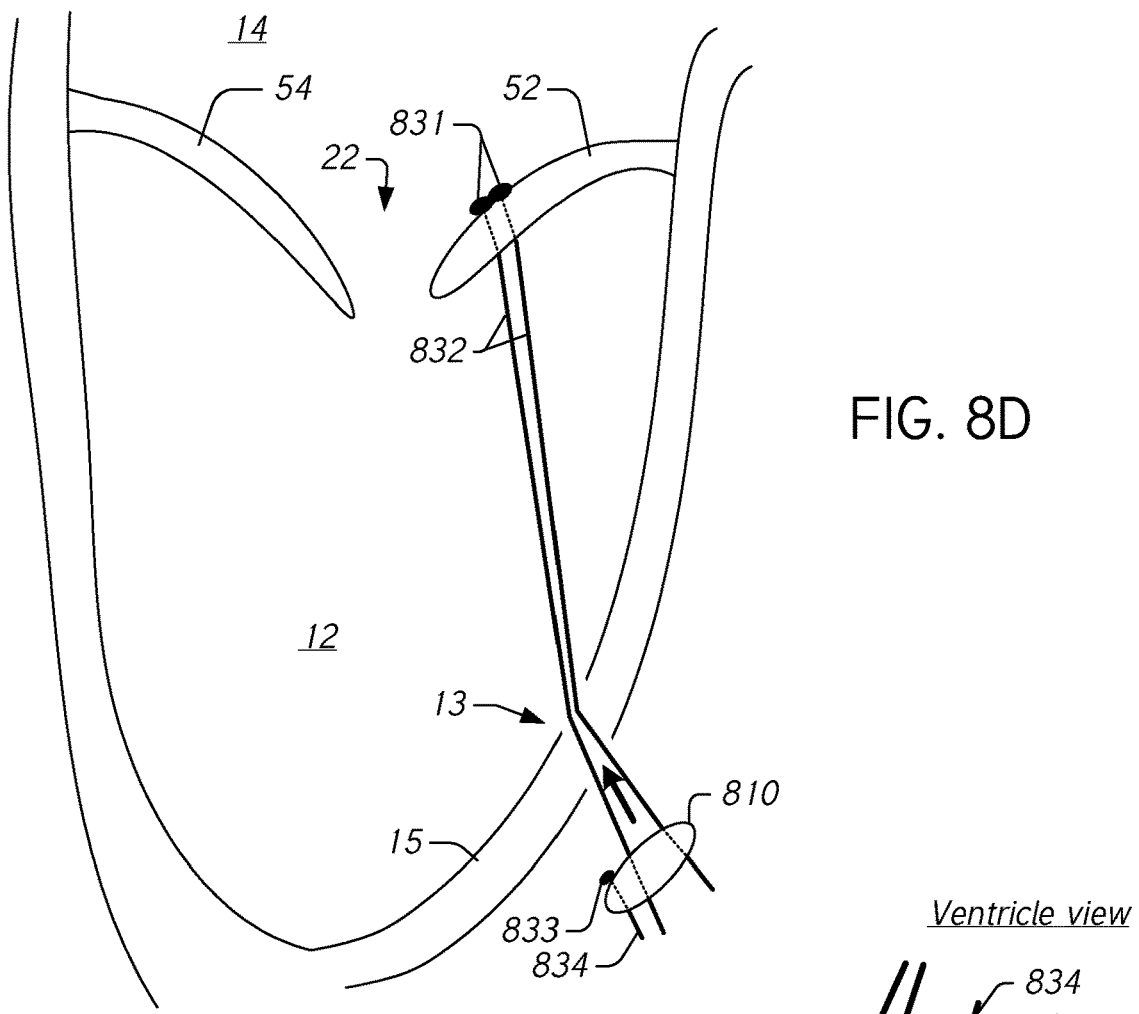

FIG. 8D illustrates a graft 81 being threaded onto the proximal ends of the sutures 832. The graft 810 can be slidably coupled to the sutures 832 by threading proximal ends of the sutures 832 through holes in the graft 810. This can be done outside of the heart. The graft 810 can then be inserted through the opening 13 into the ventricle 12, using the sutures 832 to guide advancement of the graft 810. The graft 810 includes an edge anchor 833 with edge suture 834 extending therefrom. Although a single edge anchor 833 and edge suture 834 is illustrated, it should be understood that a plurality of edge anchors may be attached to an edge of the graft 810. The edge anchor 833 and the edge suture 834 are configured to be secured to an edge of the graft 81 when implanted to the leaflet 52. The edge suture 834 can be anchored so that the edge anchor 833 and the edge suture 834 act as an artificial cord. The artificial cord can be configured to reduce MR and/or to improve coaptation. In some instances, the edge anchor 833 and edge suture 834 can be installed after the graft 810 is attached to the leaflet 52.

Figure 8E:
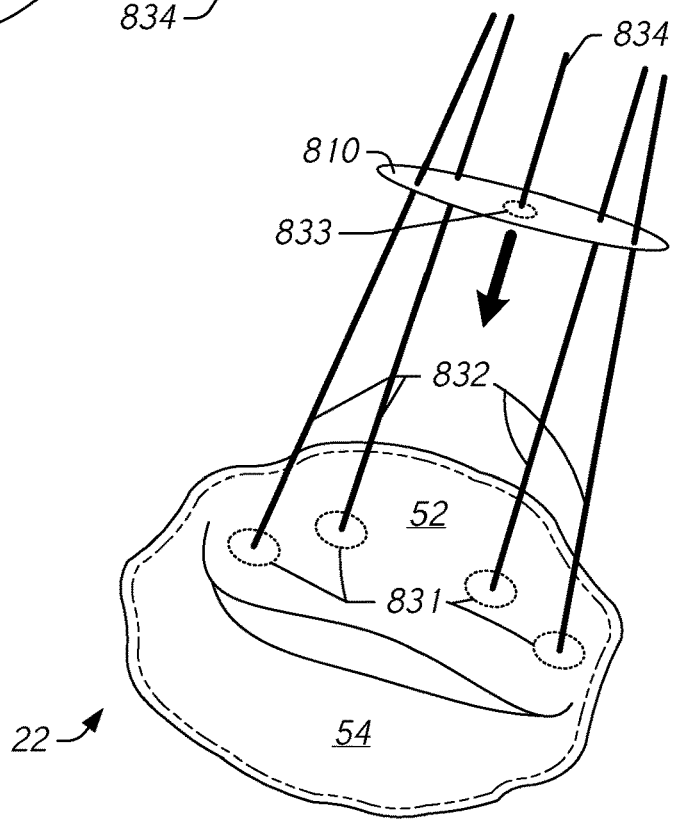

FIG. 8E illustrates the mitral valve 22 as viewed from the ventricle with the graft 810 being advanced along the sutures 832 in the ventricle 12 towards the anterior leaflet 52. The graft 810 can be advanced along the sutures 832 using any suitable tool or device. In some instances, the graft 810 is advanced at least partially along the sutures 832 using locking knots 837 slidably coupled to the sutures 832.

Figure 8F:
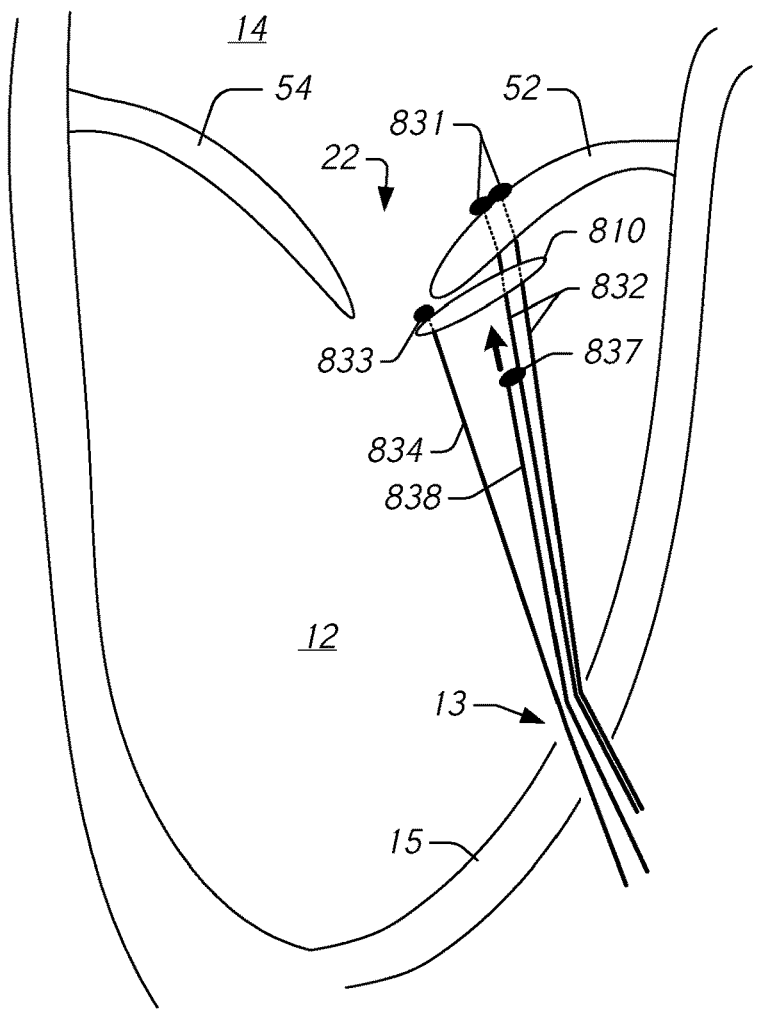
Figure 8G:
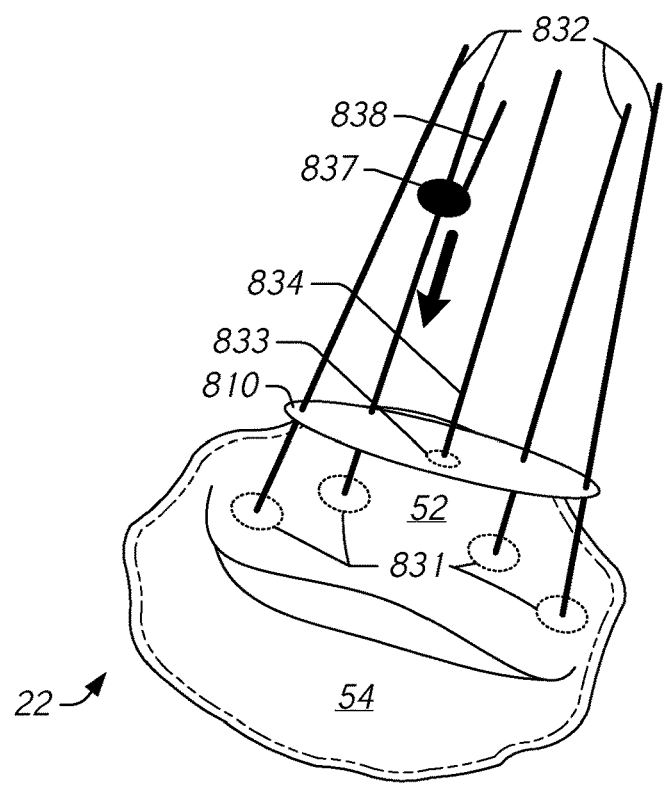

FIGS. 8F and 8G illustrate a locking knot 837 with locking suture 838 being advanced along the sutures 832 towards the graft 810 and the leaflet 52. The locking knot 837 has a delivery configuration in which the locking knot 837 is pushable, slidable or deliverable along or about the sutures 832, and a deployed configuration in which the locking knot 837 is further engaged with, further constricted about, compressed (e.g., radially and/or laterally), cinched, secured, tightened, or fixed to the sutures 832, such that relative motion between the locking knot 837 and the sutures 832 is inhibited and/or prevented. In the delivery configuration, the locking knot 837 is wrapped, intertwined, looped, turned, wound, or otherwise engaged with one or more of the sutures 832 in a manner that allows the locking knot 837 to maintain its structural integrity (e.g., its coiled disposition) such that it is in a ready-state to be deployed, while allowing sufficient relative movement between the locking knot 837 and the sutures 832. This allows the locking knot 837 to be moved distally and/or proximally along the sutures 832. In some instances, the locking suture 838 can be pulled from outside the heart to deploy the locking knot 837. Although a single locking knot 837 and locking suture 838 is illustrated, it should be understood that a plurality of locking knots can be used. Furthermore, although the locking knot 837 is illustrated as slidably coupled to a single suture 832, it should be understood that a single locking knot 837 could be slidably coupled to a plurality of sutures 832.

Figure 8H:
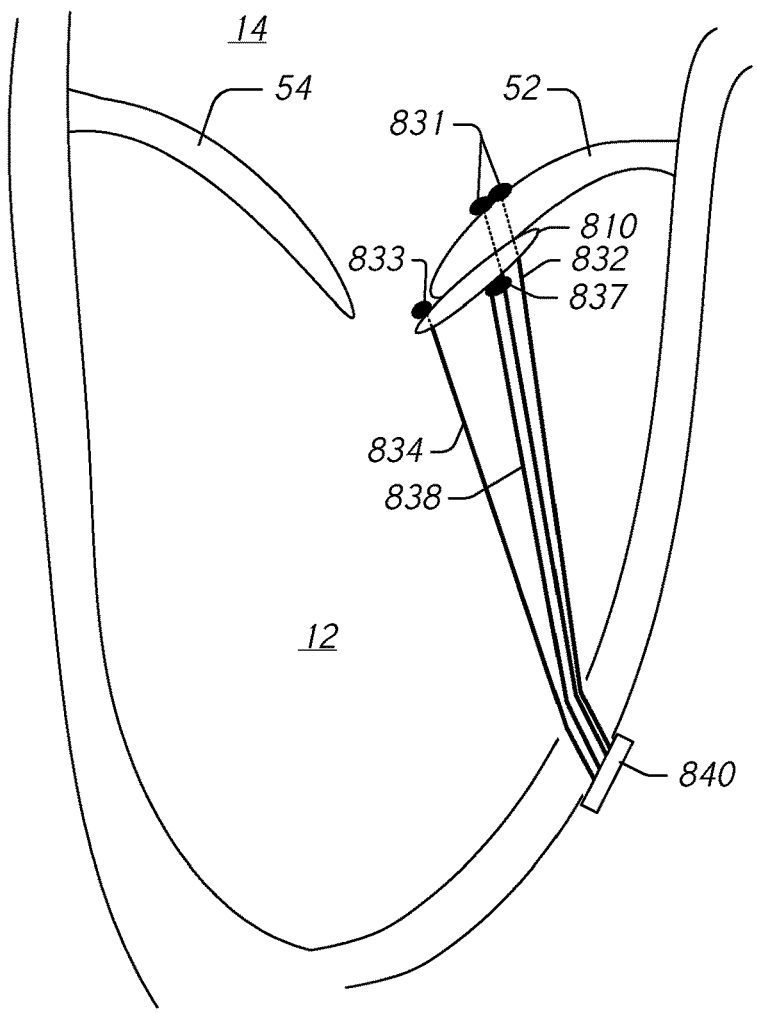
Figure 8I:
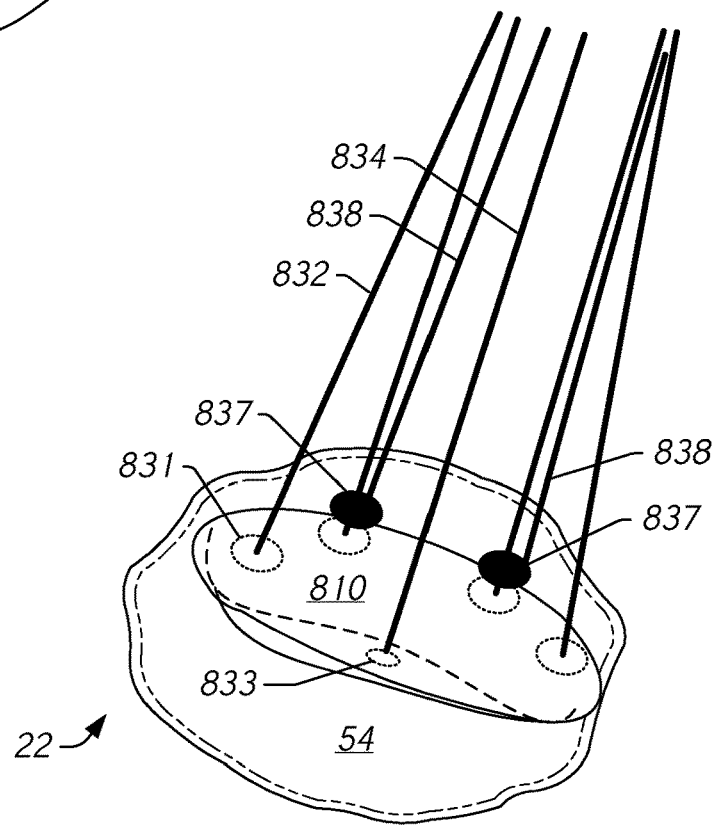

FIGS. 8H and 8I illustrate the locking knot 837 deployed to secure the graft 810 in place. Additional locking knots 837 can be deployed to secure the graft 810 to the leaflet 52. The sutures 832, edge suture 834, and locking suture 838 can be anchored to an external wall of the heart using a proximal anchor 840, such as a pledget. In some instances, additional edge anchors can be implanted to adjust the graft 810. This can be done, for example, to reduce MR and/or to improve coaptation.

Figure 9:
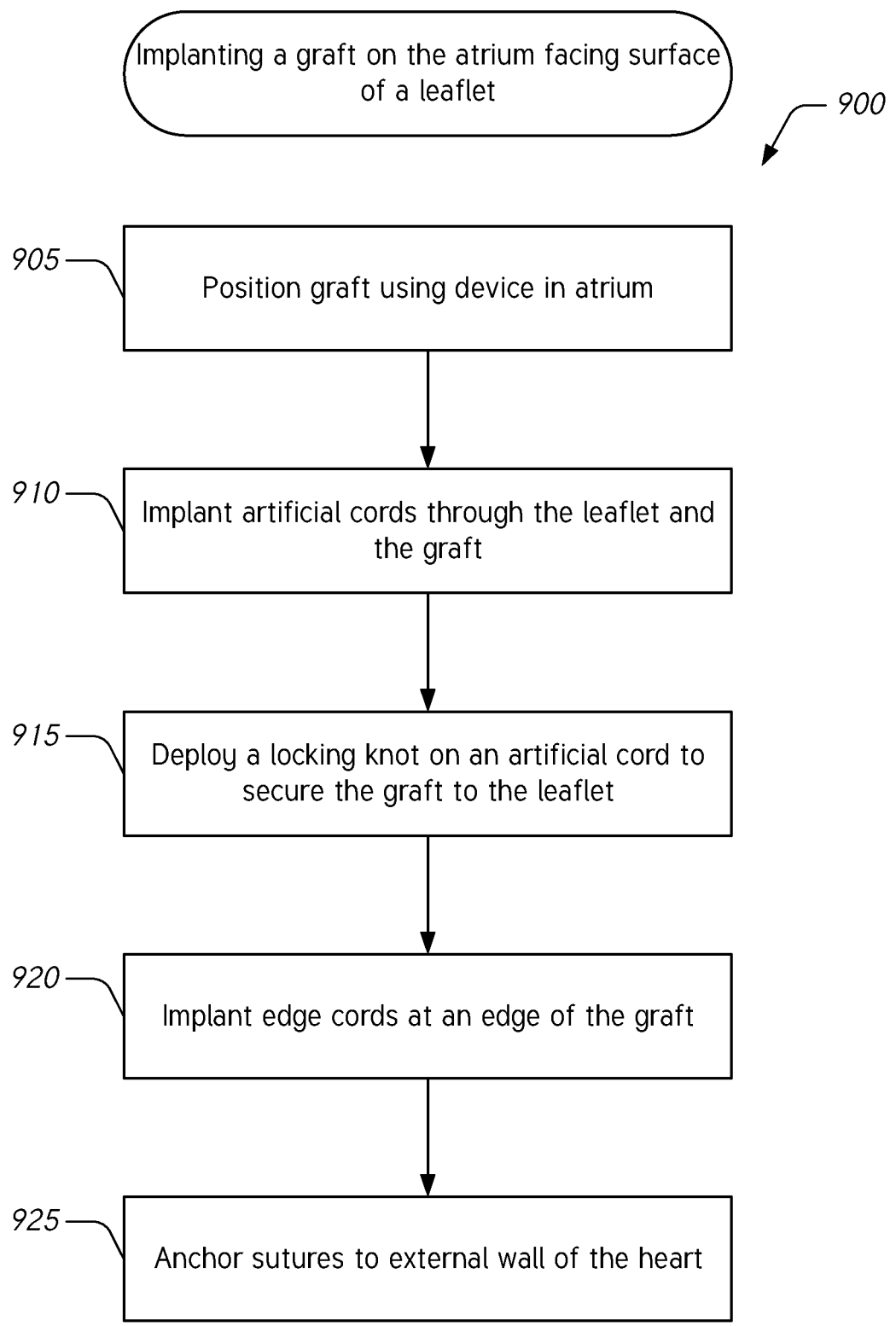
FIG. 9 illustrates a flow chart of an example method for implanting a graft on the atrium-facing surface of a leaflet.

FIG. 9 illustrates a flow chart of an example method goo for implanting a graft on the atrium-facing surface of a leaflet. The method 900 can be performed to elongate, to reinforce, and/or to patch the leaflet. The method 900 can be performed to improve coaptation of the leaflets and/or to reduce regurgitation. The method 900 can be performed using a minimally invasive procedure while the heart is still beating. The method 900 is described as being performed on the anterior leaflet of the mitral valve but it is to be understood that the method 900 can be performed on the posterior leaflet of the mitral valve or on another valve. Furthermore, the method 900 can be performed to implant multiple grafts to a leaflet. Advantageously, the method 900 implants the graft on the atrium-facing side of the leaflet to reduce or to eliminate interference with native cords.

In block 905, a graft is positioned on the atrium-facing surface of the leaflet using a device or tool. The device or tool can be any suitable device for temporarily securing the graft against the leaflet. Prior to being positioned in the atrium on the leaflet, the graft can be cut to a desired size and shape.

In block 910, one or more distal anchors with sutures are implanted. Collectively, a distal anchor with a proximal suture can be referred to as an artificial cord. The distal anchors are inserted through the tissue of the leaflet and the graft from the ventricle. The distal anchors are deployed on the atrial side of the graft with the sutures extending proximally from the distal anchors to a region away and/or outside of the left ventricle or heart.

In some instances, the artificial cords can be installed using a delivery device as described herein. A piercing portion of such a delivery device can be used to form an opening in the leaflet tissue and the graft, through which the distal end of the delivery device can be inserted. The delivery device can be used to form or to deliver a distal anchor to the distal side of the graft and the leaflet. The delivery device can then be withdrawn, and suture portions extending from the distal anchors can extend to an outside surface of the heart.

In block 915, a locking knot is deployed on a ventricle-facing surface of the leaflet to secure the graft to the leaflet. The locking knot is directed along the sutures of the artificial cords to secure the graft against the leaflet. Proximal ends of the sutures of the artificial cords are threaded through a pre-formed locking knot. The locking knot then slides along the sutures until reaching the leaflet. The locking knot is deployed to lock the position of the locking knot on the suture, thereby securing the graft in place against the atrium-facing surface of the leaflet. In some instances, additional deployable knots may be used to secure the graft to the leaflet. In certain instances, one or more sutures may not include a locking knot. The locking knot can be any of the locking knots described herein and can be installed as described herein.

In block 920, one or more edge anchors with edge sutures (edge anchors and edge sutures together forming edge cords) are implanted on the graft. The step of block 920 is described as following securing the graft to the leaflet, but it should be understood that the step of block 920 could be performed before introducing the graft into the atrium, similar to the method 700. The edge anchors and edge sutures can be implanted in a manner similar to the distal anchors and sutures, as described herein. In some instances, the edge cords can be installed only through the graft and not a combination of the graft and the leaflet tissue. The proximal ends of the edge sutures remain outside of the heart to allow the edge cords to be adjusted, which can be done using visual guidance as described herein.

In block 925, the locking sutures, edge sutures, and anchor sutures are anchored to an external wall of the heart. The anchoring step can be done to prevent or to reduce the likelihood that the locked sutures will come loose. A pledget can be used as the anchor. For example, PTFE (Teflon®), Dupont, Wilmington, Delaware) felt can be used as an anchor where the felt is attached to the tissue wall. In some instances, the anchor includes a plurality of holes through which the sutures extend.

In instances where edge anchors and edge sutures are implanted on the edge of the graft after the graft has been secured to the leaflet, visual feedback can be used to assess regurgitation. The edge sutures can be adjusted to reduce MR prior to anchoring in the step of block 925. In some instances, the edge anchors placed near the free edge of the graft, and the edge sutures extending therefrom can be secured in a manner to improve coaptation of the anterior and posterior leaflets. In certain instances, the secured sutures can be suitably tensioned and/or pulled towards the access site and into the ventricle of the heart, resulting in a larger effective surface area of coaptation and improved coaptation between the leaflets.

FIGS. 1A-10E illustrate steps for implanting a graft 1010 on an atrium-facing surface of the anterior leaflet 52. Some of the steps of this procedure are similar to the steps described with respect to FIGS. 8A-8I. Thus, where similar, details regarding the steps will not be repeated for the sake of conciseness.

Figure 10A:
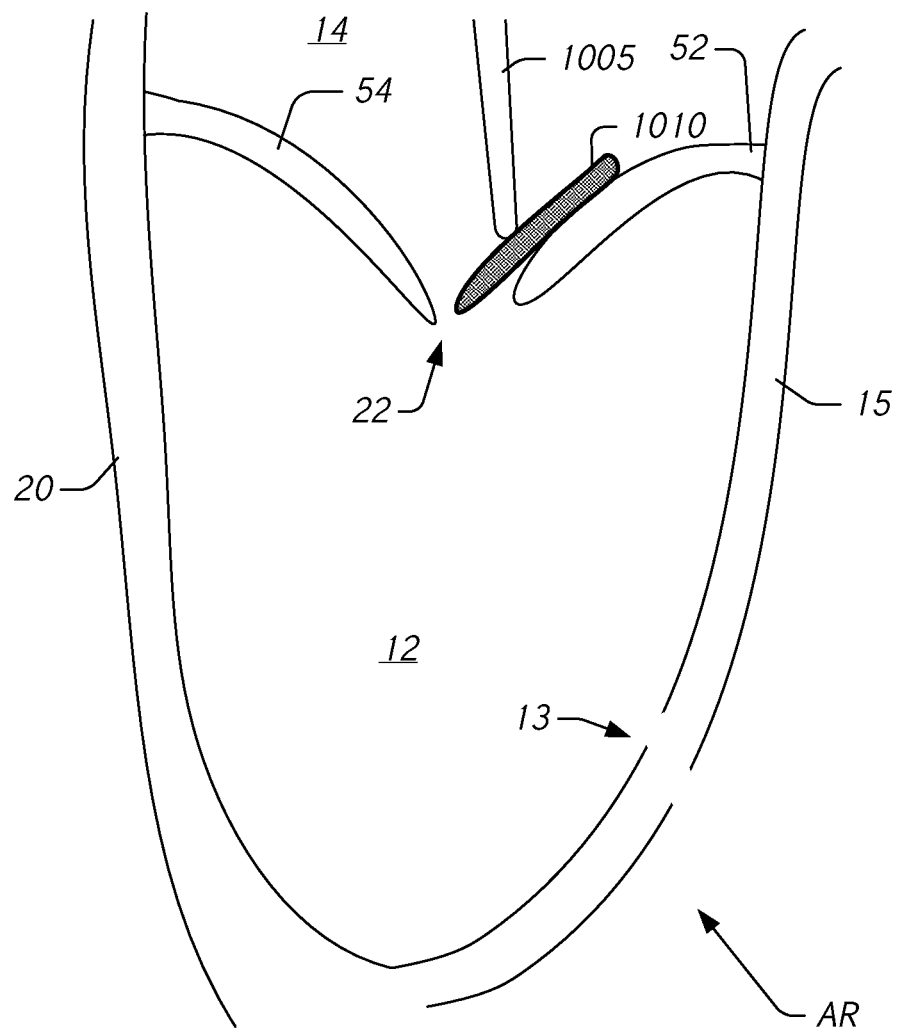
FIGS. 10A, 10B, 10C, 10D, and 10E illustrate steps in a procedure for implanting a graft on the atrium-facing surface of a leaflet.

FIG. 10A illustrates the graft 1010 being positioned in the atrium 14 with a device 1005 that holds the graft 1010 in place against the atrium-facing surface of the leaflet 52. In some embodiments, the device 1005 can use suction or a vacuum to hold the graft during the procedure. In various embodiments, the device 1005 can use mechanical means to grasp or otherwise secure the graft during the procedure. In certain embodiments, the device 1005 can include a syringe or other similar tool.

Figure 10B:
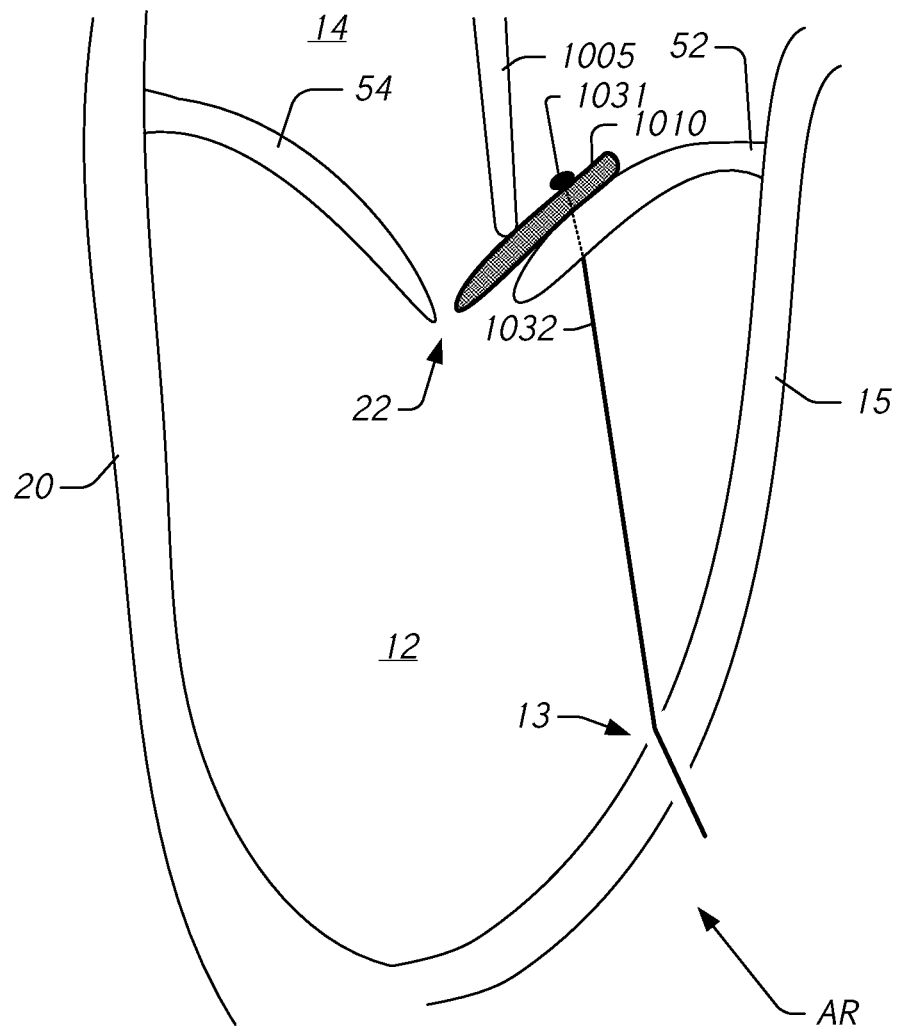
Figure 10C:
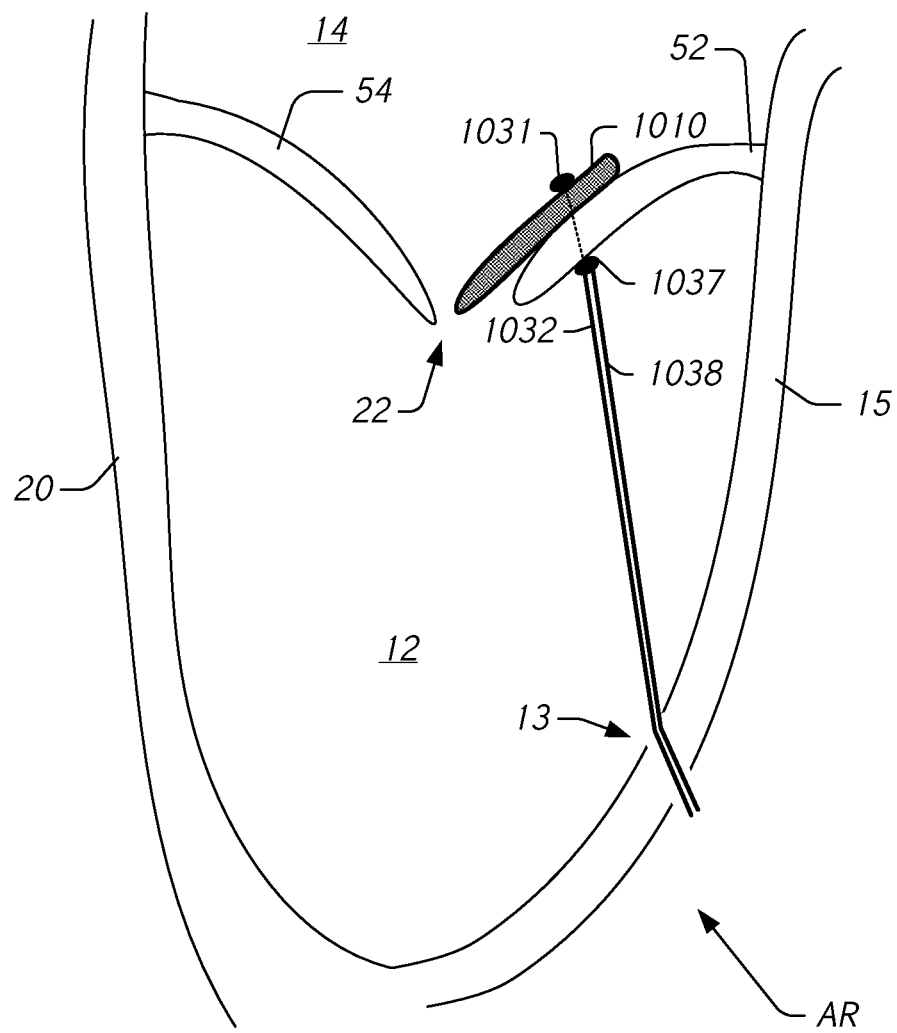

FIG. 10B illustrates installing artificial cords that include a distal anchor 1031 and sutures 1032 extending proximally through the opening 13. Similar to FIGS. 8B and 8C, a plurality of distal anchors 1031 can be implanted in the graft 1010. After one or more of the artificial cords have been implanted, the tool 1005 can be removed.

Figure 10D:
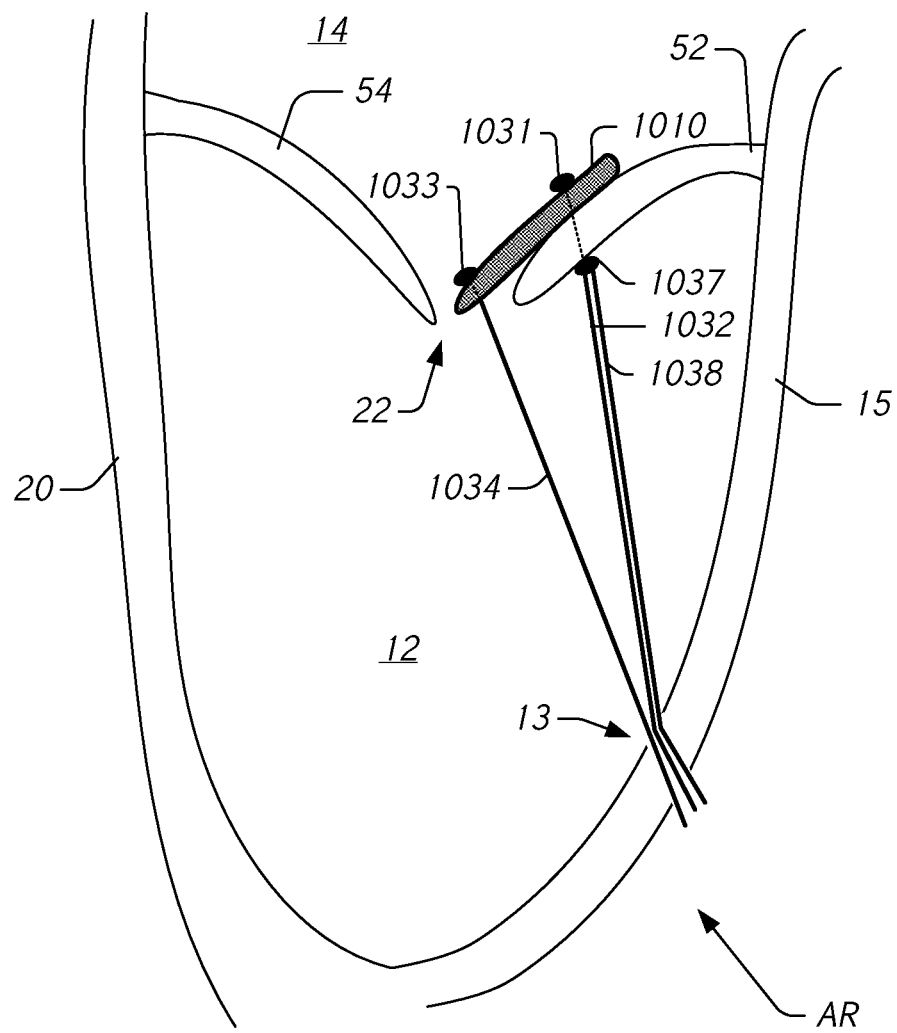
Figure 10E:
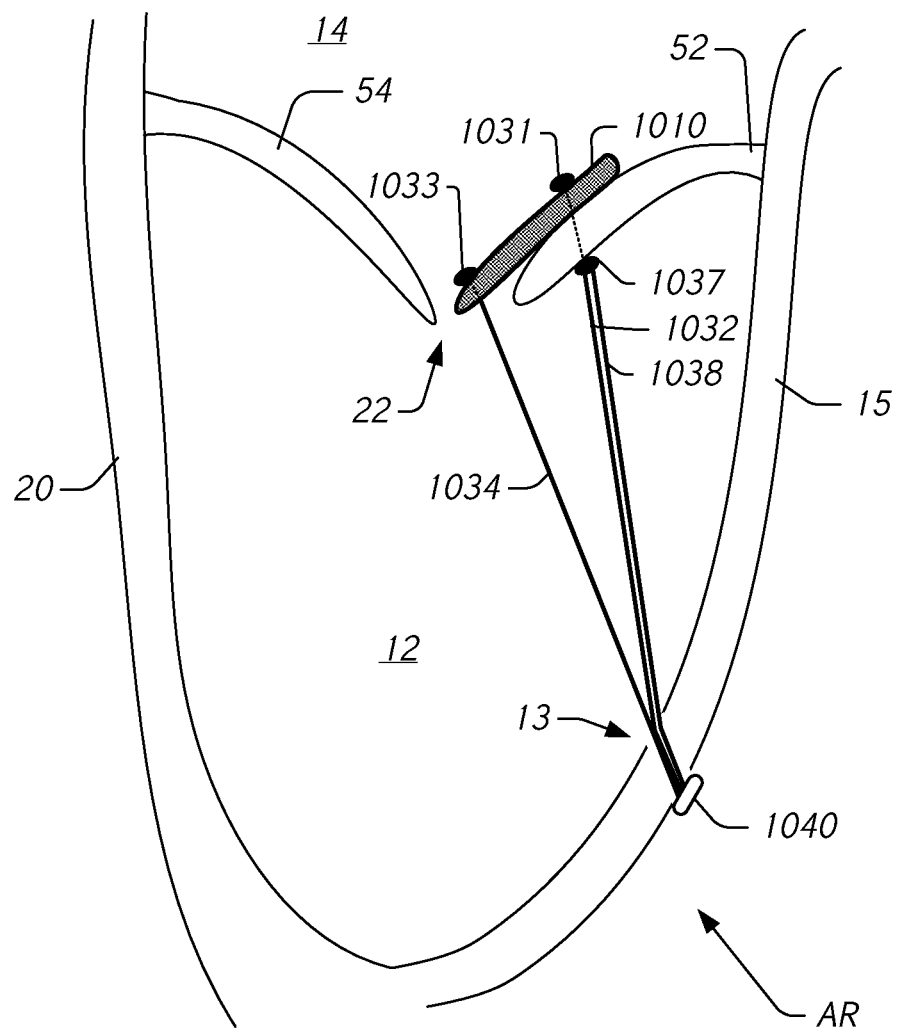

FIG. 1C illustrates deploying one or more locking knots 1037 with locking sutures 1038 on one or more of the sutures 1032 to secure the graft 1010 in place. FIG. 10D illustrates implanting one or more edge cords at or near the edge of the graft 1010, each edge cord comprising an edge anchor 1033 and edge sutures 1034 extending proximally from the edge anchor 1033 through the opening. FIG. 10E illustrates anchoring the locking suture 1038, the edge suture 1034, and the anchor sutures 1032 to an external wall outside the heart using a proximal anchor 1040.

Figure 11:
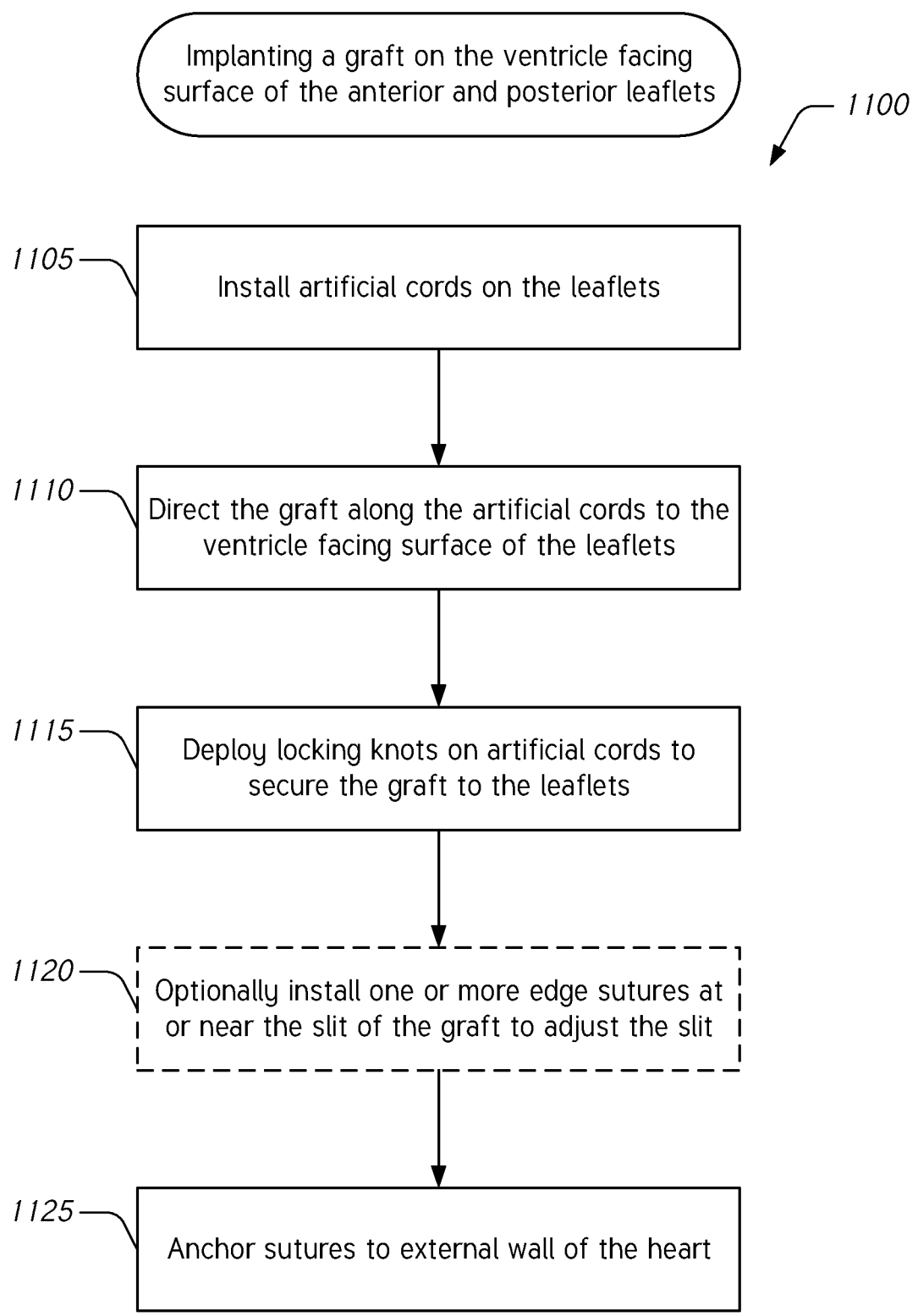
FIG. 11 illustrates a flow chart of an example method for implanting a graft on the ventricle-facing surface of both an anterior and posterior leaflet.

FIG. 11 illustrates a flow chart of an example method 1101 for implanting a graft on the ventricle-facing surface of both an anterior and posterior leaflet. The method 1101 can be performed to achieve results similar to a mitral valve repair utilizing an edge-to-edge technique or Alfieri technique. The method 1100 can be performed to reduce or eliminate MR. The method 1101 can be performed using a minimally invasive procedure while the heart is still beating. The method 1101 is described as being performed on the mitral valve but it is to be understood that the method 1101 can be performed on another valve. Advantageously, the method 1101 enables the graft to be guided into place from outside the heart using sutures anchored to the leaflets. The method 1101 is similar to the method 700 and reference is made to similar steps of the method 700 for the sake of conciseness.

In block 1105, similar to block 705 of the method 700, artificial cords are installed in the posterior and anterior leaflets. The artificial cords include anchors at a distal end that are anchored to the posterior and to the anterior leaflet. The cords also include sutures extending proximally from the anchors. These sutures extend proximally from the distal anchors to a region away and/or outside of the left ventricle or heart. In some instances, the artificial cords can be installed using a delivery device.

In block 1110, similar to block 715 of the method 700, the graft is directed along the sutures of the artificial cords to the ventricle-facing surfaces of the leaflets. The graft can be cut to a desired size and shape prior to implanting to the leaflets. The graft can include a slit configured to align with the gap between the anterior and posterior leaflets (e.g., see the gap 55 in FIG. 2B and the slit 111 in FIGS. 6A-6D). The sutures of the artificial cords can be threaded through the graft outside the heart. The sutures of the artificial cords act as a guide or rail to slide the graft from outside the heart to the ventricle-facing surfaces of the leaflets.

In block 1115, similar to block 720 of the method 700, locking knots are directed along the sutures of the artificial cords to position and to secure the graft against the leaflets. Proximal ends of the sutures of the artificial cords are threaded through pre-formed locking knots. The locking knots then slide along the sutures to push against the graft. The locking knots are deployed to lock the position of the locking knot on the respective suture, thereby securing the graft in place against the leaflets. In various instances, at least one locking knot is used on a suture implanted on the anterior leaflet side and at least one locking knot is used on a suture implanted on the posterior leaflet side. In some instances, additional deployable knots may be used to secure the graft to the leaflets. In certain instances, one or more sutures may not include a locking knot.

In optional block 1120, one or more edge anchors with edge sutures, forming one or more edge cords, are implanted at or near the slit of the graft. The step of optional block 1120 is described as following deployment of the locking knots in block 115, but it should be understood that the step of block 1120 could be performed prior to securing the graft to the leaflets, similar to the method 700. The proximal ends of the edge sutures remain outside of the heart to allow the edge cords to be adjusted after implantation. This can be done using visual guidance to improve coaptation and/or to reduce MR.

In block 1125, similar to block 725 of the method 700, the locking sutures, edge sutures, and anchor sutures are anchored to an external wall of the heart. The anchoring step can be done to prevent or to reduce the likelihood that the locked sutures will come loose. A pledget can be used as the anchor.

In instances where edge anchors and sutures are implanted at or near the slit of the graft after the graft has been secured to the leaflets, visual feedback can be used to assess regurgitation. The sutures can be adjusted to reduce MR prior to anchoring in the step of block 1125. In some instances, the edge anchors placed near the slit of the graft, and the sutures extending therefrom can be secured in a manner to reduce or eliminate MR.

Figure 12:
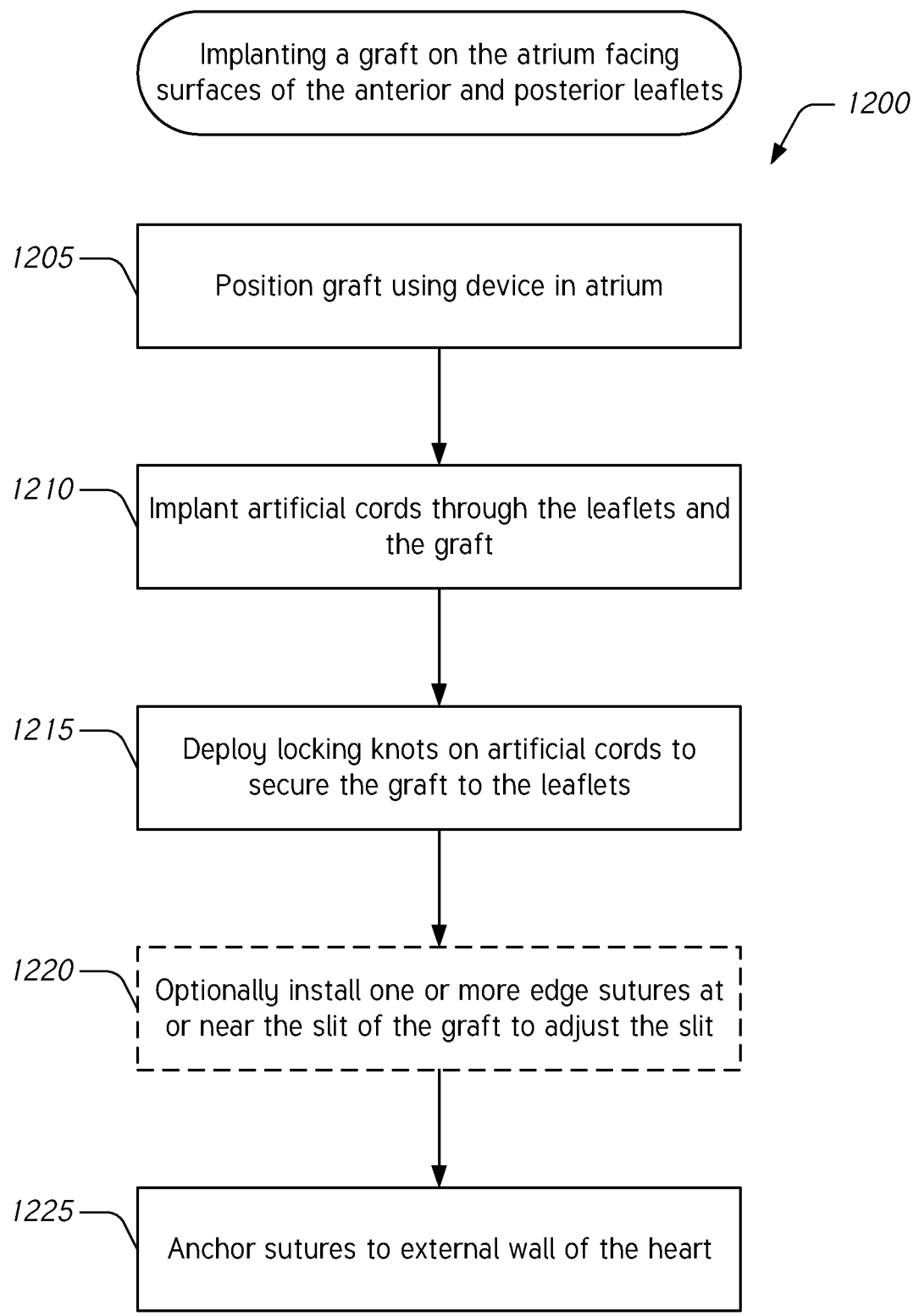
FIG. 12 illustrates a flow chart of an example method for implanting a graft on the atrium-facing surface of both an anterior and posterior leaflet.

FIG. 12 illustrates a flow chart of an example method 1200 for implanting a graft on the atrium-facing surface of both an anterior and posterior leaflet. The method 1200 is similar to the method 1100 in that the method 1200 can be performed to achieve results similar to a mitral valve repair utilizing an edge-to-edge technique or Alfieri technique. The method 1200 can be performed to reduce or eliminate MR. The method 1200 can be performed using a minimally invasive procedure while the heart is still beating. The method 1200 is described as being performed on the mitral valve but it is to be understood that the method 1200 can be performed on another valve. Advantageously, the method 1200 enables the graft to be implanted on the atrium-facing surfaces of the leaflets, avoiding or eliminating potential interference with native cords. The method 1200 is similar to the method 900 and reference is made to similar steps of the method goo for the sake of conciseness and clarity.

In block 1205, similar to block 905 of the method goo, a graft is positioned on the atrium-facing surfaces of the anterior and posterior leaflets using a device or tool. The device or tool can be any suitable device for temporarily securing the graft against the leaflet. Prior to being positioned in the atrium on the leaflets, the graft can be cut to a desired size and shape including a slit, similar to the graft of the method 1100 and of FIG. 6.

In block 1210, similar to block 910 of the method goo, one or more distal anchors with sutures are implanted. The distal anchors are inserted through the tissue of each leaflet and the graft from the ventricle. The distal anchors are deployed on the atrial side of the graft with the sutures extending proximally from the distal anchors to a region away and/or outside of the left ventricle or heart.

In block 1215, similar to block 915 of the method goo, locking knots are deployed on the ventricle-facing surfaces of the leaflets to secure the graft to both the anterior and posterior leaflets. The locking knots are directed along sutures of the artificial cords to secure the graft against the leaflets. Proximal ends of the sutures of the artificial cords are threaded through a pre-formed locking knot. The locking knot then slides along the sutures until reaching the leaflets. The locking knots are deployed to lock the position of the respective locking knot on the suture, thereby securing the graft in place against the atrium-facing surface of the leaflets. In some instances, additional deployable knots may be used to secure the graft to the leaflets. In various instances, at least one locking knot is used on a suture implanted on the anterior leaflet side and at least one locking knot is used on a suture implanted on the posterior leaflet side. In certain instances, one or more sutures may not include a locking knot. The locking knot can be any of the locking knots described herein and can be installed as described herein.

In optional block 1220, one or more edge anchors with edge sutures, forming one or more edge cords, are implanted at or near the slit of the graft. The step of optional block 1220 is described as following deployment of the locking knots in block 1215, but it should be understood that the step of block 1220 could be performed prior to securing the graft to the leaflets, similar to the method 700. The proximal ends of the edge sutures remain outside of the heart to allow the edge cords to be adjusted after implantation. This can be done using visual guidance to improve coaptation and/or to reduce MR.

In block 1225, similar to block 925 of the method goo, the locking sutures, edge sutures, and anchor sutures are anchored to an external wall of the heart. The anchoring step can be done to prevent or to reduce the likelihood that the locked sutures will come loose. A pledget can be used as the anchor.

In instances where edge anchors and sutures are implanted at or near the slit of the graft after the graft has been secured to the leaflets, visual feedback can be used to assess regurgitation. The sutures can be adjusted to reduce MR prior to anchoring in the step of block 1225. In some instances, the edge anchors placed near the slit of the graft, and the sutures extending therefrom can be secured in a manner to reduce or to eliminate MR.

Additional Examples and Terminology

Figure 13:
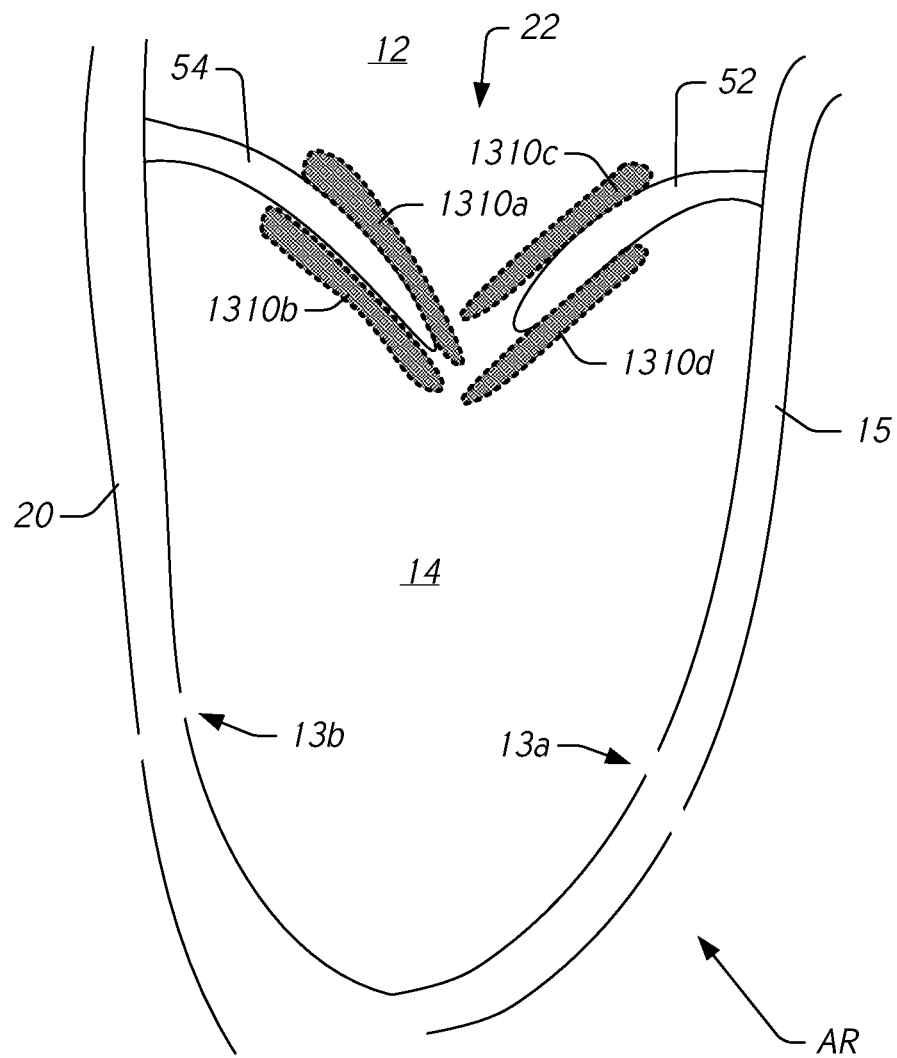
FIG. 13 illustrates example locations of one or more grafts implanted on leaflets of a mitral valve.

FIG. 13 illustrates example locations of one or more grafts 1310*a*-1310*d* implanted on leaflets 52,54 of the mitral valve 22. The graft 1310*a* can be implanted on an atrium-facing surface of the posterior leaflet 54, the graft 1310*b* can be implanted on a ventricle-facing surface of the posterior leaflet 54, the graft 1310*c* can be implanted on an atrium-facing surface of the anterior leaflet 52, and the graft 1310*d* can be implanted on a ventricle-facing surface of the anterior leaflet 52. Any one graft 1310*a*, 1310*b*, 1310*c*, or 1310*d* or any combination of two or more of the grafts 1310*a*, 1310*b*, 1310*c*, and 1310*d* can be implanted to the leaflets 52, 54. The grafts 1310*a*-1310*d* can be implanted using a transapical approach, such as through opening 13*a*, using an approach through the septum 20, such as through opening 13*b*, or using a transcatheter or other suitable approach.

Figure 14A:
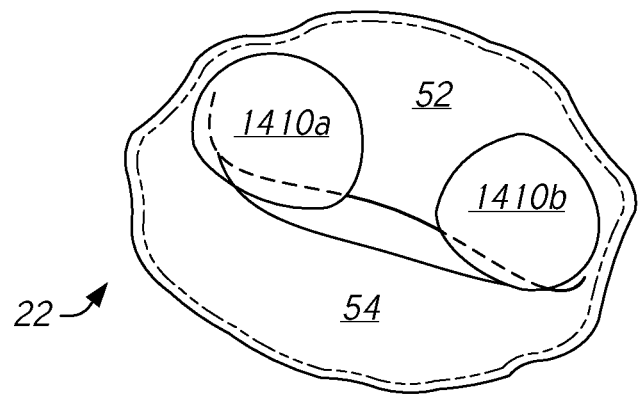
FIGS. 14A and 14B illustrate examples of multiple grafts implanted on leaflets of a mitral valve.
Figure 14B:
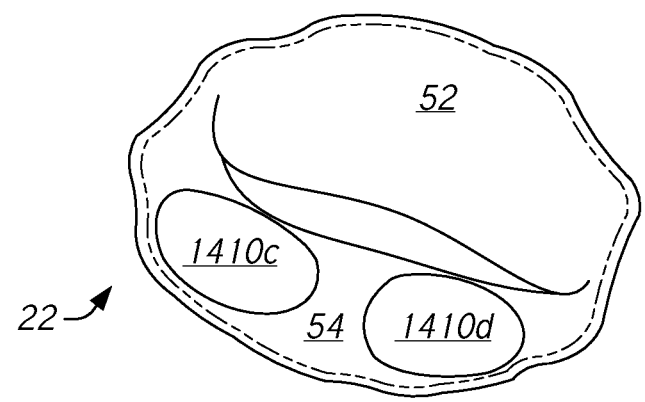

FIGS. 14A and 14B illustrate examples of multiple grafts 1410*a*-1410*d* implanted on leaflets 52, 54 of the mitral valve 22. FIG. 14A illustrates a combination of grafts 1410*a*, 1410*b* implanted to the anterior leaflet 52 and FIG. 14B illustrates a combination of grafts 1410*c*, 1410*d* implanted to the posterior leaflet 54. In some instances, a leaflet may have limited tissue in some areas and it would be beneficial to reinforce those areas. In such instances, grafts can be implanted to the areas with limited tissue. For example, as illustrated in FIG. 14A, grafts 1410*a*, 1410*b* may be implanted to areas A1 and A3 of the anterior leaflet 52 and/or, as illustrated in FIG. 14B, grafts 1410*c*, 1410*d* may be implanted to areas P1 and P3 of the posterior leaflet 54 to strengthen those particular areas. In certain instances, this may be more beneficial than implanting a single larger graft covering a large portion of the anterior or posterior leaflet or a single graft substantially covering the entire anterior or posterior leaflet.

In combination with FIG. 13, FIGS. 14A and 14B illustrate that two or more grafts can be implanted on the same surface of a leaflet (e.g., atrium-facing surface or ventricle-facing surface), on different surfaces of a leaflet, on the same surfaces of different leaflets, or on different surfaces of different leaflets. The combination of grafts can be implanted to elongate, to reinforce, and/or to patch the leaflets to which they are attached.

In the methods disclosed herein, additional anchors and cords may be implanted. For example, to promote a larger surface of coaptation, anchors may be deployed in the body of the leaflets and/or at or near the annulus of the anterior and posterior leaflets, and the cords extending therefrom can be secured together and pulled to move the posterior annulus towards the anterior leaflet and/or the anterior annulus towards the posterior leaflet, thereby reducing the distance between the anterior annulus and the posterior annulus, e.g., the septal-lateral distance. Said another way, approximating the anterior annulus and the poster annulus in this manner can decrease the valve orifice, and thereby decrease, limit, or otherwise prevent undesirable regurgitation. This can be done in conjunction with implanting a graft to a leaflet, as described herein, to increase coaptation and to reduce MR.

As another example, in some instances in which a patient has a clefted leaflet, a graft can be implanted over the cleft. The implanted graft can be used to provide an improved surface to enhance or improve coaptation.

The procedures described herein can be performed manually, e.g., by a physician, or can alternatively be performed fully or in part with robotic or machine assistance. Further, although not specifically described herein, in various instances the heart may receive rapid pacing to reduce the relative motion of the edges of the valve leaflets during the procedures described herein (e.g., while an anchor, suture, graft, and/or locking suture is being delivered and deployed).

While various examples have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or examples described above indicate certain components arranged in certain orientations or positions, the arrangement of components may be modified. While the examples have been particularly shown and described, it will be understood that various changes in form and details may be made. Any portion of the apparatus and/or methods described herein may be combined in any combination, except mutually exclusive combinations. The examples described herein can include various combinations and/or sub-combinations of the functions, components and/or features of the different examples described.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings provided herein can be applied to other methods and systems and are not limited to the methods and systems described above, and elements and acts of the various examples described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for implanting a graft on a ventricle-facing surface of a leaflet in a heart, the method comprising:
   puncturing a wall of a ventricle near an apex of the heart to gain access to the ventricle;
   installing an artificial cord having a distal anchor and a suture extending proximally from the distal anchor, the distal anchor deployed on an atrium-facing surface of the leaflet, the suture extending proximally through the leaflet and through the puncture in the wall of the ventricle to a region outside the heart;
   implanting an edge cord at an edge of a graft, the edge cord including an edge anchor and an edge suture extending from the edge anchor, the graft configured to extend beyond an edge of the leaflet to effectively elongate the leaflet;
   directing the graft along the artificial cord from the region outside the heart to the ventricle-facing surface of the leaflet such that a proximal end of the edge cord extends through the puncture in the wall of the ventricle to the region outside the heart; and
   deploying a mechanical fastener to secure the graft to the ventricle-facing surface of the leaflet, the suture of the artificial cord being threaded through the mechanical fastener outside of the heart and then being directed along the artificial cord to secure the graft against the leaflet.

2. The method of claim 1, wherein the graft reduces mitral valve regurgitation.

3. The method of claim 1, wherein the method is performed while the heart is beating.

4. The method of claim 1, further comprising anchoring the suture and the edge suture to an external wall of the heart.

5. The method of claim 1, wherein the mechanical fastener comprises a locking knot, the locking knot including a locking suture extending proximally from the locking knot.

6. The method of claim 5 further comprising advancing the locking knot distally along the artificial cord to secure the graft to the ventricle-facing surface of the leaflet.

7. The method of claim 5, wherein the suture, the edge suture, and the locking suture extend proximally through an opening in a wall of a ventricle.

8. The method of claim 5, wherein the suture of the artificial cord is threaded through the locking knot and the locking knot is directed along the artificial cord to push against the graft.

9. The method of claim 8 further comprising deploying the locking knot by tensioning the locking suture in the region outside of the heart.

10. The method of claim 1, further comprising adjusting a tension on the edge suture to adjust coaptation of the leaflet.

11. The method of claim 1, wherein the graft is slidably coupled to the artificial cord outside of the heart prior to directing the graft along the artificial cord to the ventricle-facing surface of the leaflet.

12. The method of claim 1, wherein the edge cord is implanted prior to directing the graft along the artificial cord.

13. The method of claim 1, wherein the edge cord is implanted after directing the graft along the artificial cord.

14. The method of claim 1, wherein directing the graft to the leaflet includes using the artificial cord as a guide for the graft through the ventricle to the ventricle-facing surface of the leaflet.

15. The method of claim 1, wherein the edge cord is implanted at the edge of the graft prior to the graft entering the ventricle and prior to directing the graft to the ventricle-facing surface of the leaflet.

16. The method of claim 1, wherein the mechanical fastener is further used to position the graft against the leaflet.

17. The method of claim 1, wherein the mechanical fastener is deployed after the graft is positioned against the leaflet.

18. The method of claim 1 further comprising deploying one or more additional edge cords to an edge of the graft after deployment of the mechanical fastener.

19. The method of claim 18 further comprising adjusting the one or more additional edge cords to adjust the graft to improve coaptation.

20. The method of claim 1, wherein the mechanical fastener has a delivery configuration in which the mechanical fastener is slidable along the suture of the artificial cord and a deployed configuration in which the mechanical fastener is fixed to the suture of the artificial cord to inhibit relative movement between the mechanical fastener and the suture of the artificial cord.

* * * * *